United States Patent [19]
Ream, Jr.

[11] Patent Number: 5,822,272
[45] Date of Patent: Oct. 13, 1998

[54] CONCENTRIC FLUID ACOUSTIC TRANSPONDER

[75] Inventor: Donald E. Ream, Jr., Solana Beach, Calif.

[73] Assignee: The United States of America as represented by the Secretary of the Navy, Washington, D.C.

[21] Appl. No.: 910,620

[22] Filed: Aug. 13, 1997

[51] Int. Cl.[6] .................................................. H04B 1/59
[52] U.S. Cl. ................................................ 367/2; 367/131
[58] Field of Search ........................... 367/2, 151, 131, 367/87; 441/20

[56] References Cited

U.S. PATENT DOCUMENTS

| | | | |
|---|---|---|---|
| 2,461,181 | 2/1949 | Rosenberg | 367/151 |
| 2,465,993 | 4/1949 | Beechly | 367/1 |
| 2,520,520 | 8/1950 | Woodard | 367/2 |
| 2,716,758 | 9/1955 | Hajecate | 441/20 |
| 3,195,677 | 7/1965 | Hillery et al. | 367/1 |
| 3,397,413 | 8/1968 | Houtsma | 441/20 |
| 3,447,627 | 6/1969 | Buck et al. | 367/1 |
| 3,965,234 | 6/1976 | Lane, Jr. | 441/20 |
| 4,126,847 | 11/1978 | Etkins | 441/20 |
| 4,416,509 | 11/1983 | Milan | 441/20 |

*Primary Examiner*—Daniel T. Pihulic
*Attorney, Agent, or Firm*—Harvey Fendelman; Michael A. Kagan; Peter A. Lipovsky

[57] ABSTRACT

An acoustic transponder method and apparatus provides a high degree of frequency and target strength selectivity by utilizing two or more concentrically disposed, hollow spheres each containing acoustically refractive fluids. The invention provides the possibility of using spheres of a variety of diameters and as well a number of different refractive fluids, enabling the production of an acoustic transponder having a wide variety of selective frequency responses as well as effective target diameters.

11 Claims, 24 Drawing Sheets

CONCENTRIC FLUID ACOUSTIC TRANSPONDER

BACKGROUND OF THE INVENTION

This invention relates generally to an underwater sound reflector and more particularly to a passive underwater sound transponder having a high degree of frequency and target strength selectivity.

Undersea navigation, surveying, salvage, relocation and sonar system calibration often require that a platform located on the surface or underwater be able to identify specific, uniquely identifiable, locations on the ocean bottom or in the water column. Underwater location markers might also need to be uniquely identifiable from all other markers in an immediate area.

To satisfy these requirements, active acoustic transponders are often used. These active devices require an internal battery power source and also contain an acoustic receiver, a transmitter and decoding circuitry. The navigating platform generates a waterborne acoustic interrogation pulse that is received by the transponder. The transponder replies by transmitting its own acoustic pulse at a unique and known frequency. The platform receives and decodes this unique reply. It can then be determined which specific transponder replied, and its approximate location. The transponder could also be used simply as a location or homing marker. Additionally, if the transponder's position is accurately known, this interrogation/reply process can be used for general navigation purposes. If several transponders are deployed, they can be used together in a network to provide precise navigation capabilities.

The basic limitation of the active transponder is that it is a powered, active electronic device. These devices are expensive, and usually require careful handling during at-sea deployments. They are also subject to the normal circuit failures of any electronic device. Their operating life is relatively short due to the limited energy available from the internal battery power source.

In addition to the active transponders, passive acoustic transponders of various types, i.e. transponders requiring no internal power source, are sometimes used for simple location marking and for sonar calibration purposes. These generally have an inherent, broadband frequency response with no frequency selectivity. It is this ability to work over a wide frequency range that makes passive transponders desirable for some applications. For instance, a single broadband, non-frequency selective target could be used for calibrating sonars operating on many different frequencies.

A need exists for an acoustic transponder that does not have the drawbacks of battery and circuit failures while at the same time has the capability of a high degree of frequency and target strength selectivity.

SUMMARY OF THE INVENTION

The invention provides these needs as well as other advantages and features that will become apparent from the ensuing description. The concentric fluid acoustic transponder of the invention is a passive transponder capable of a high degree of frequency response selectivity. In a preferred embodiment, the transponder is constructed from two, concentrically disposed, hollow spheres. The "inner" and "outer" spheres are preferably of thin-walled, stainless steel construction. The spheres are held concentric with respect to each other by structural members that in one embodiment include two, small diameter, radially located positioning tubes attached between the spheres. In this embodiment, these tubes can be used for filling the inner and outer spheres with acoustically refractive fluids. The diameter of the inner sphere defines what is described herein as an inner, fluid core, region while the gap between the inner and outer spheres defines what is described as an outer, concentric fluid, region or layer. The invention provides the possibility of using spheres of a variety of diameters and as well a number of different refractive fluids, enabling the production of an acoustic transponder having a wide variety of selective frequency responses, target strengths and diameters.

OBJECTS OF THE INVENTION

An object of this invention to provide a passive acoustic transponder that can easily be tuned to provide a selected frequency response.

A further object of this invention is to provide a passive acoustic transponder that can be tuned to provide a selected target strength.

Still another object of the invention is to provide a passive acoustic transponder that is expendable.

Still another object of the invention is to provide a passive acoustic transponder that is easily deployable.

Still a further object of the invention is to provide a passive acoustic transponder that can be used for maritime and underwater navigation purposes.

Yet another object of this invention is to provide a passive acoustic transponder that can be used for maritime and underwater surveying.

Still another object of this invention is to provide a passive acoustic transponder that can be used as an underwater location marker.

Other objects, advantages and new features of this invention will become apparent from the following detailed description of the invention when considered in conjunction with the accompanied drawings.

DESCRIPTION OF THE INVENTION

Figure 1:
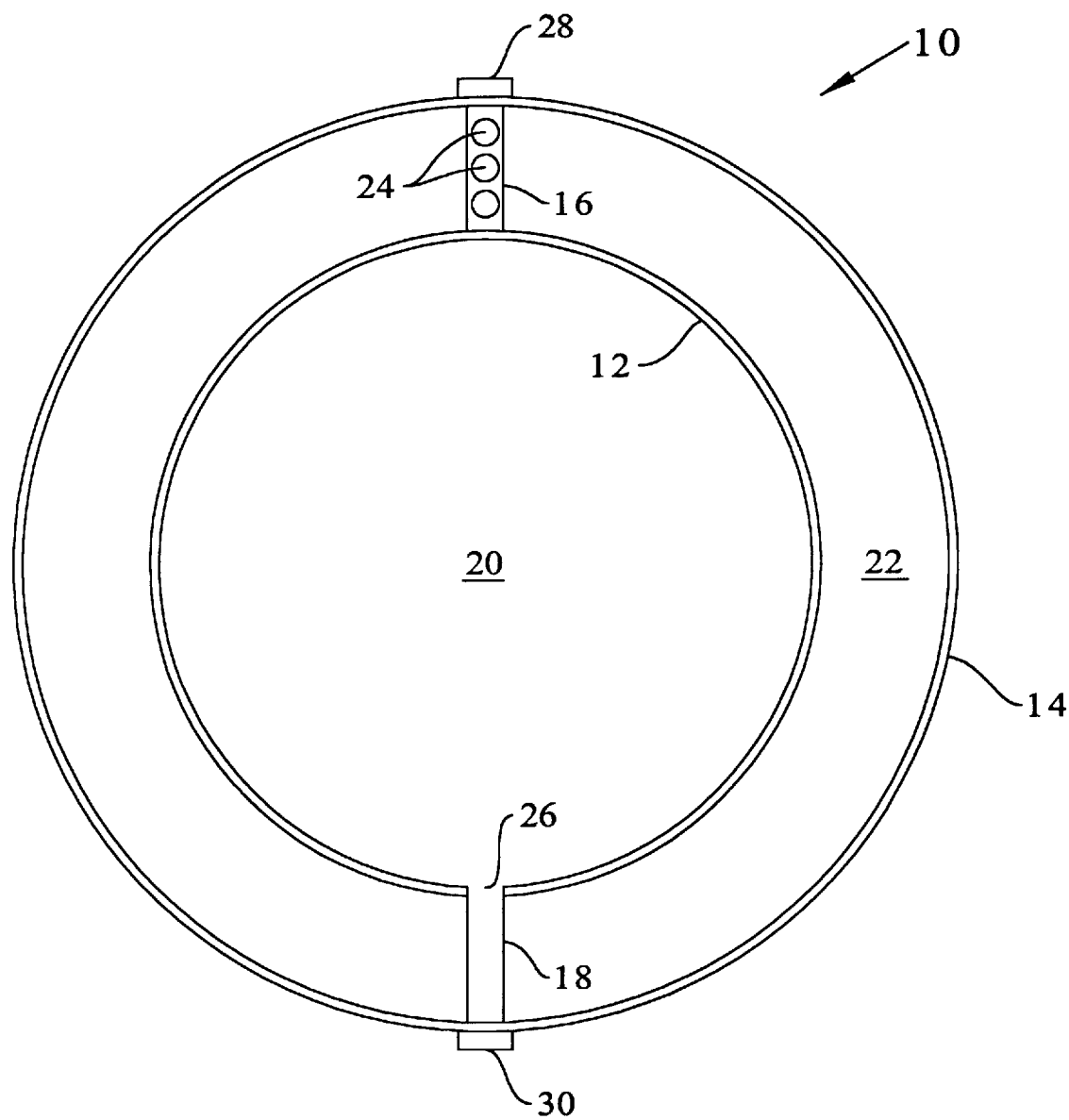
FIG. 1 illustrates a cross-sectional view of an exemplary concentric fluid acoustic transponder according to the invention in which two fluid regions are employed.

The United States Navy has developed several passive, underwater acoustic target systems for use with sonar systems. One such traditional acoustic target uses a single fluid, spherical acoustic lens as an acoustic reflector.

Such a spherical acoustic lens is, generally, omnidirectional, with a relatively broadband frequency response. Illumination of such a lens with sonic energy causes the incident acoustic energy to be focused inside the lens and redirected back along the same path from which it originated. These spherical acoustic lens are typically of thin-walled steel construction and are filled with a refractive fluid. Design parameters for such an acoustic lens include the following variables:

1. Frequency of the incident acoustic energy
2. Pulsewidth of the incident acoustic energy
3. Sphere diameter
4. Sphere-material physical/acoustic properties
5. Sphere wall-thickness
6. Refractive fluid properties These parameters are optimized to insure that the incident energy is sufficiently refracted (i.e. bent) and focused on the back-surface of the sphere. Focusing the incident acoustic energy in this way maximizes the target strength, or returned energy, for a particular lens configuration. Different target strengths are attained by using various sphere-diameter/ refractive-fluid combinations. At ultrasonic frequencies above 100 kHz with pulsewidths less than 1 msec, these targets can be very compact (e.g., diameters of 10–15 cm/4–6") and efficient (e.g., −5 to −20 dB target strengths).

At these high frequencies and very short wavelengths, it was observed that the wall-thickness of the spherical steel sphere had a substantial effect on the frequency response of the target. As the wall-thickness approached a tenth-to-quarter wavelength of the acoustic energy involved, severe variations in the target strength of the lens can occur. To lessen this effect, very thin-walled spheres have been used (e.g., 0.75–1.30 mm/0.03–0.05"; 20–18 gauge). It was found that if the ratio of the sphere's inner diameter to its outer diameter is no less than 0.98–0.99, these variations in target return strength are minimized.

It was also learned that the sound velocity in the wall-material had a profound effect on the target strength of the lens. Any incident acoustic energy would be refracted somewhat while passing through the wall material. Ideally, the sphere's wall would be fabricated from a material thin enough to have little or no effect on the impinging acoustic energy. This would allow the properties of the internal refractive fluid to completely control the degree of sound raybending and focusing. Unfortunately, such a wall material is either non-existent or impractical because the wall must be constructed of a material able to maintain the target's expected form factor (i.e., a sphere), and be able to withstand the rigors of the ocean environment. This limits most wall material choices to either thin, high-density, materials with high sound velocities, or thick, low-density, materials with lower sound velocities. In either case, if the refraction within the wall-material occurs over a relatively large thickness, the preliminary raybending caused thereby can drastically alter the refractive (or focusing) effects of the fluid inside the sphere. As the focusing efficiency decreases, the number of multiple reflections within the sphere increases. This situation further degrades the target strength and frequency response performance of the target.

While the effects described above are considered negative constraints when designing a traditional broadband, high target strength, acoustic lens, it was thought that these limiting factors could be used to purposely alter the frequency response of an acoustic lens. An empirical approach to characterizing lens performance was thus undertaken. In-water, laboratory-quality, acoustic measurements were used to investigate the effects of changing various lens parameters. These included wall-material, wall-thickness, sphere diameter and refractive fluid. Prefabricated spheres were used and were selected of materials considered to be suitable for full scale production. Several refractive fluids were selected based on past performance and experience. Table 1 lists the refractive fluids and sphere materials considered.

TABLE 1

NOMINAL SOUND SPEED OF TARGET-RELATED MATERIALS

| Material | Nominal Sound Speed (m/sec @ 25–26 deg C.) | Wavelength @ 20 kHz (Cm/in) |
|---|---|---|
| Fluids: | | |
| Fresh Water | 1466 (4810 ft/sec)* | 7.3 (2.9") |
| Fluorolube FS-5 (Chlorotrifluoroethylene Polymer) | 883 (2896 ft/sec)* | 4.4 (1.7") |
| Freon 113 (Trichlorotrifluoroethane) | 706 (2316 ft/sec)* | 3.5 (1.4") |
| Methyl Alcohol | 1160 (3805 ft/Sec)* | 5.8 (2.3") |
| Perfluoro (Methylcyclohexane) | 619 (2031 ft/sec)* | 3.1 (1.2") |
| Spheres: | | |
| Acetal Fibre Thermoplastic | 2314 (7590 ft/sec)* | 11.6 (4.6") |
| Stainless Steel (SS) | 5000 (16400 ft/sec) | 25.0 (9.8") |
| Syntactic Foam | 2073 (6800 tt/sec) | 10.4 (4.1") |

NOTE:* = The sound speed was determined from a direct measurement of acoustic travel time using acoustic reflectrometry techniques.

The investigation began by considering a traditional acoustic lens configuration composed of a single, spherical, thin-walled shell containing a refractive fluid in its enclosed volume. This configuration will be identified herein as the "single sphere", or "single fluid", configuration. Table 2 lists the various sphere/fluid combinations tested during this initial test sequence.

TABLE 2

SINGLE SPHERE TEST CONFIGURATIONS

| Sphere Material | O.D. (in.) | Wall Thick. (in.) | Refractive Fluid | Freq Range (kHz) | |
|---|---|---|---|---|---|
| | | | | 10 60 | 50 250 |
| Type 304 SS | 5 | 0.0375 | Freon | x | |
| Type 304 SS | 6 | 0.0375 | Fluorolube | x | x |
| | | | Perfluoro | x | |
| Type 304 SS | 8 | 0.050 | Freon | x | x |
| Thermoplastic | 8 | 0.50 | Fluorolube | x | x |
| | | | Freon | x | x |
| | | | Perfluoro | x | x |
| Acetal Fibre | 8 | 0.25 | Freon | x | x |
| Syntactic Foam | 8 | 0.50 | Fresh Water | | x |
| | | | Fluorolube | x | x |

Results of this test phase, to be further described, showed that the available sphere materials and wall-thicknesses did not provide satisfactory responses at lower frequencies and longer wavelengths of interest.

This led to creation of the present invention, that of surrounding an inner core (i.e., solid sphere) of fluid with a concentric fluid layer (i.e., a spherical annulus). Such a construction would produce a target having "inner" and "outer" fluid regions. By using this method, a "fluid" wall-thickness of several inches, if necessary, could be provided. There are fluids available with a wide range of sound velocities and densities both lower and higher than seawater. These fluids could be used to simulate, or replace, the acoustic properties of the materials that would otherwise be needed to construct a spherical, thick-walled acoustic lens. A factor in using two, or more, fluids is one of maintaining a desired spatial relationship between them (e.g., concentric layers). A type of constraining, or containment, technique would be required. A practical target device would also allow for packaging, deployment and use in a hostile ocean environment. These problems were solved by placing a smaller, thin-walled spherical shell inside a larger, thin-walled spherical shell. Steel was chosen as a preferred material for the shells.

Referring now to FIG. 1, a general configuration of a two-fluid acoustic transponder according to an exemplary embodiment of the invention is shown. In this figure, it can be seen that acoustic transponder 10 includes a first fluid container 12 and a second fluid container 14 that surrounds fluid container 12. The term "fluid" as used herein is meant to be either a liquid or a gas, as one skilled in the art will realize that either of these forms of fluid may be used with the invention. In a preferred embodiment of the invention, fluid containers 12 and 14 are spherical, though one skilled in the art will realize that other shapes may also provide desired acoustic properties. Spheres 12 and 14 are preferably made of thin gauge stainless steel (18 to 20 gauge) and are preferably held concentric to each other by any of a variety of structural members such as by small diameter tubes 16 and 18. Of course, a variety of materials may be utilized as shell materials provided that these satisfy the operational and environmental requirements of the user. Similarly, the positioning of one shell concentrically within a second shell is considered to be a preferred arrangement of the shells, though it can be envisioned that other, non-concentric arrangements are possible and may in some cases be advantageous.

For test purposes, a method was needed to fill, empty, and refill fluid core region 20 and fluid concentric region 22 with various liquid test fluids. Tubes 16 and 18, located in the space between shells 12 and 14, were used for these purposes. These tubes each have one or more ports, for example, tube 16 has ports 24 and tube 18 has port 26. Caps 28 and 30 would be removed to permit filling and draining of regions 22 and 20, respectively.

A production model of the transponder of the invention would not necessarily require the filler tubes illustrated in FIG. 1, since the particular fluid to be used would be known. In this case the inner sphere could be filled and sealed before final assembly. Smaller diameter, solid rods, could then be used to maintain the necessary interior spacing.

Figure 2:
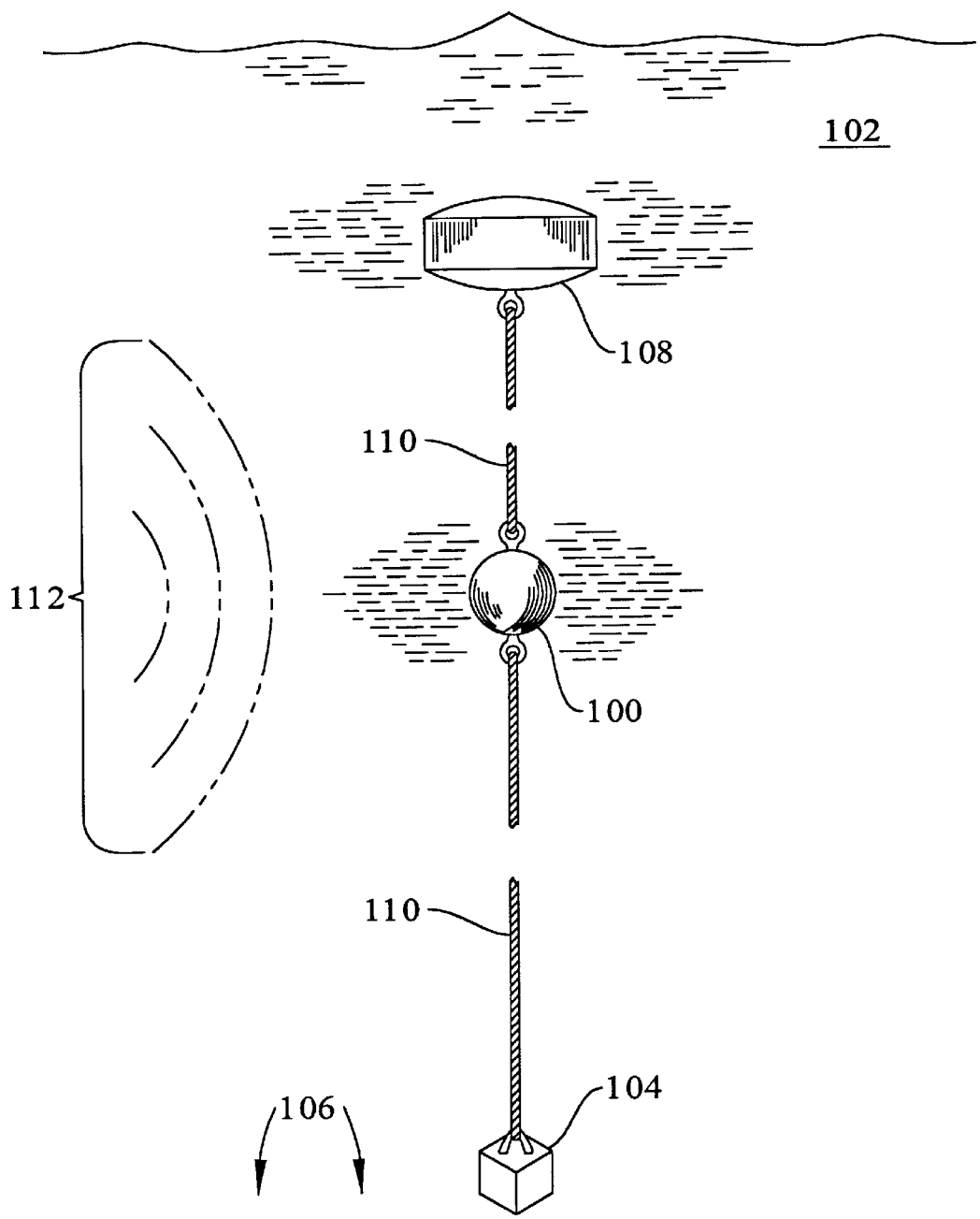
FIG. 2 illustrates an exemplary deployment of an acoustic transponder system employing a concentric acoustic transponder according to the invention.

In FIG. 2, an exemplary method of using the invention is shown. Referring now to this figure, it can be seen that concentric fluid acoustic transponder 100 of the invention can be employed within water column 102 by suspending transponder 100 between a mooring 104 disposed on bottom 106 of water column 102 and a float 108 located either on the surface of water column 102 or located subsurface, as shown. A cable 110, chain or other connector can be used to link transponder 100 to mooring 104 and float 108. Cable 110 can be attached to transponder 100 by way of attachment loops, netting or other suitable attachment mechanism. In use, transponder 100 will be insonified with acoustic energy 112, so as to absorb and reflect a portion of this energy resulting in the transponder having a unique acoustic signature detectable by surface and subsurface platforms. Those skilled in the art will realize that a variety of other deployment or mounting techniques utilizing the invention are feasible. For example, the transponder could be positioned in very close proximity to the ocean floor using a mechanical support or fixture of various designs.

A technique was developed to fabricate the concentric fluid acoustic transponder of the invention in stages, using thin-walled hemispheres. For test purposes, two concentric-fluid targets were made. The first unit had a 7.6 cm (3") diameter inner shell, with a 12.7 cm (5") diameter outer shell. The second unit had a 12.7 cm (5") diameter inner shell, with a 17.8 cm (7") diameter outer shell. In both cases, this resulted in a nominal 2.5 cm (1") wide gap between the two concentric, spherical shells. Equivalently, this gap produces a 2.5 cm (1") thick, outer concentric fluid-layer completely surrounding the inner fluid-core. All sphere shells tested had a wall-thickness of 0.0375" (20 gauge) stainless steel. Table 3 lists the various concentric-fluid/sphere-diameter combinations tested.

TABLE 3

| CONCENTRIC-FLUID TEST CONFIGURATIONS | | | |
|---|---|---|---|
| ID/OD | Refractive Fluids | Freq Range (kHz) | |
| (in.) | (inner/outer) | 10 60 | 50 250 |
| 3/5 | Freon/Freon | x | |
|  | Freon/Perfluoro | x | |
|  | Perfluoro/Fluorolube | x | |
| 5/7 | Fluorolube/Perfluoro | x | x |
|  | Fluorolube/Freon | x | |
|  | Fluorolube/Methyl Alcohol | x | |
|  | Freon/Perfluoro | x | |
|  | Freon/ Fluorolube | x | |
|  | Freon/Methyl Alcohol | x | |
|  | Perfluoro/Freon | x | |
|  | Perfluoro/Fluorolube | x | |
|  | Perfluoro/Methyl Alcohol | x | |
|  | Methyl Alcohol/Perfluoro | x | |

Figure 3:
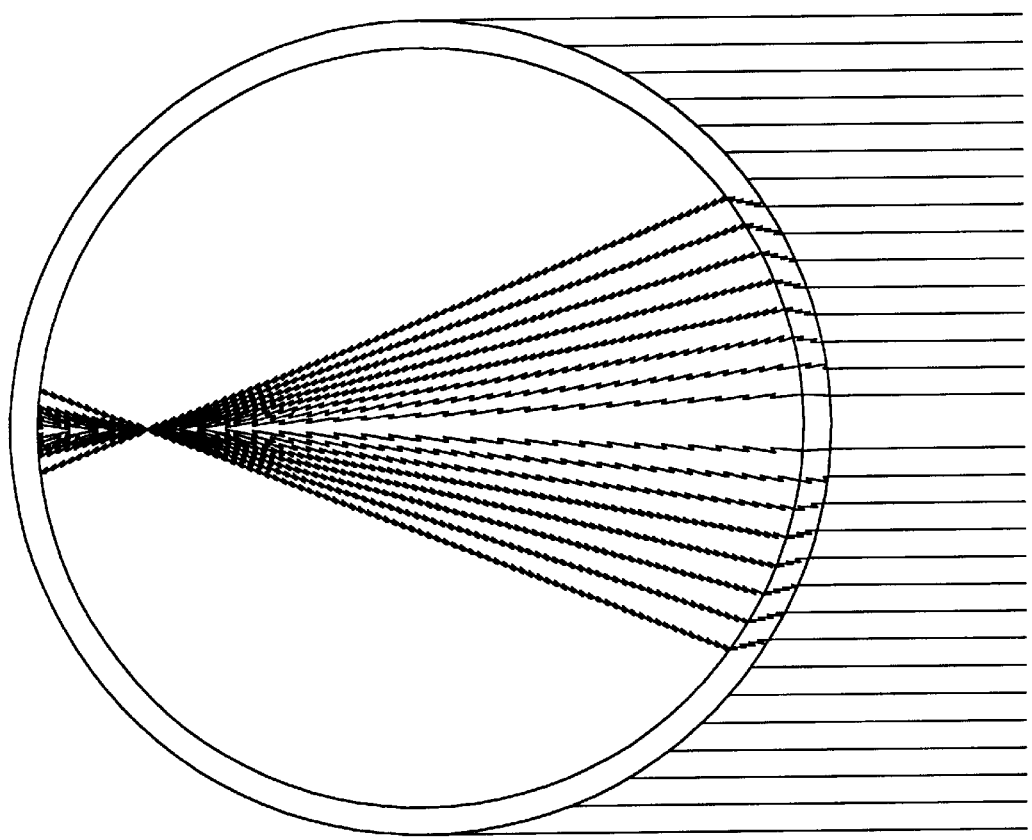
FIG. 3 depicts computer generated raypaths associated with an acoustic transponder employing two fluid regions as in accordance with the invention.
Figure 4:
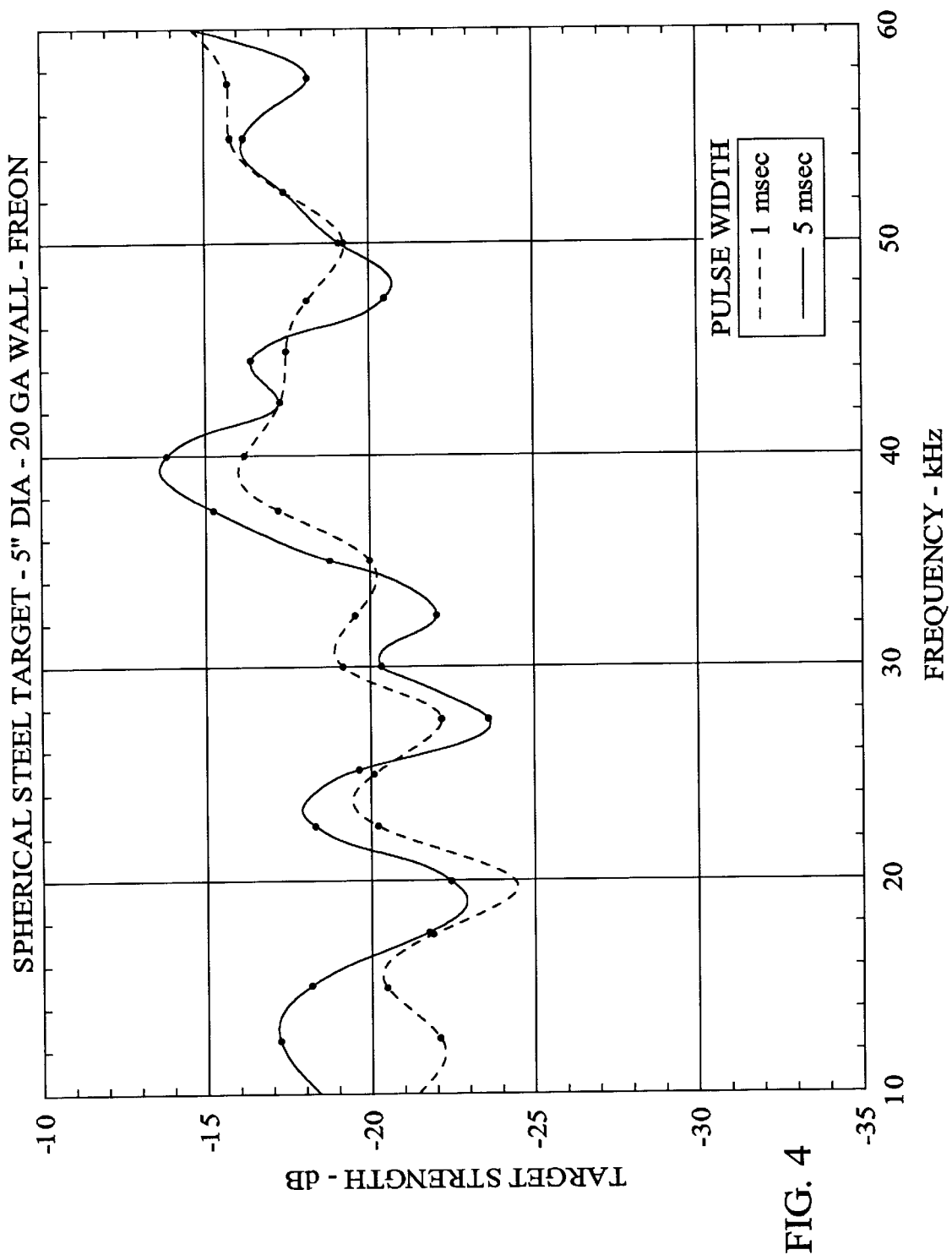
FIGS. 4–11 depict target strength versus frequency for a number of single fluid acoustic transponders.
Figure 5:
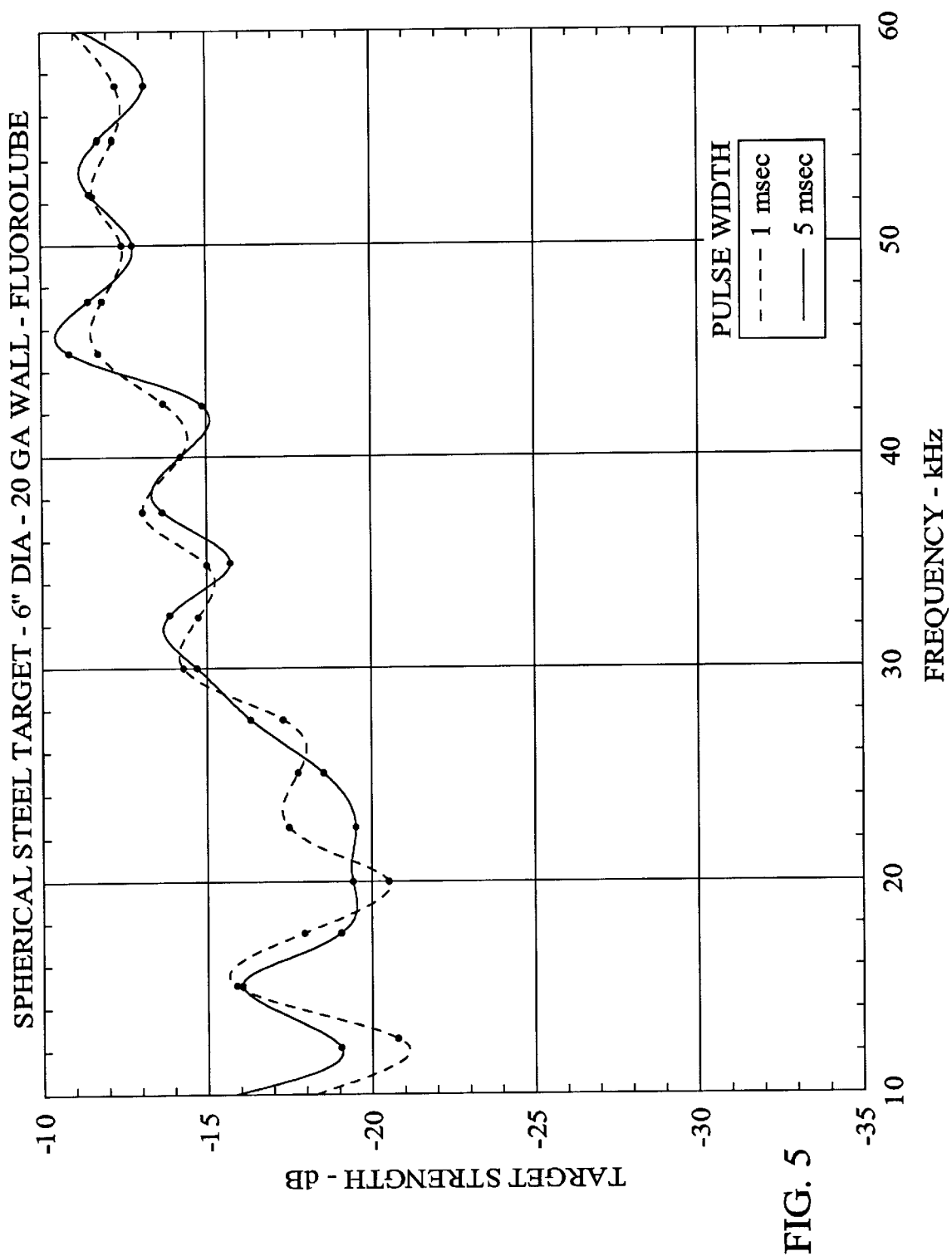
Figure 6:
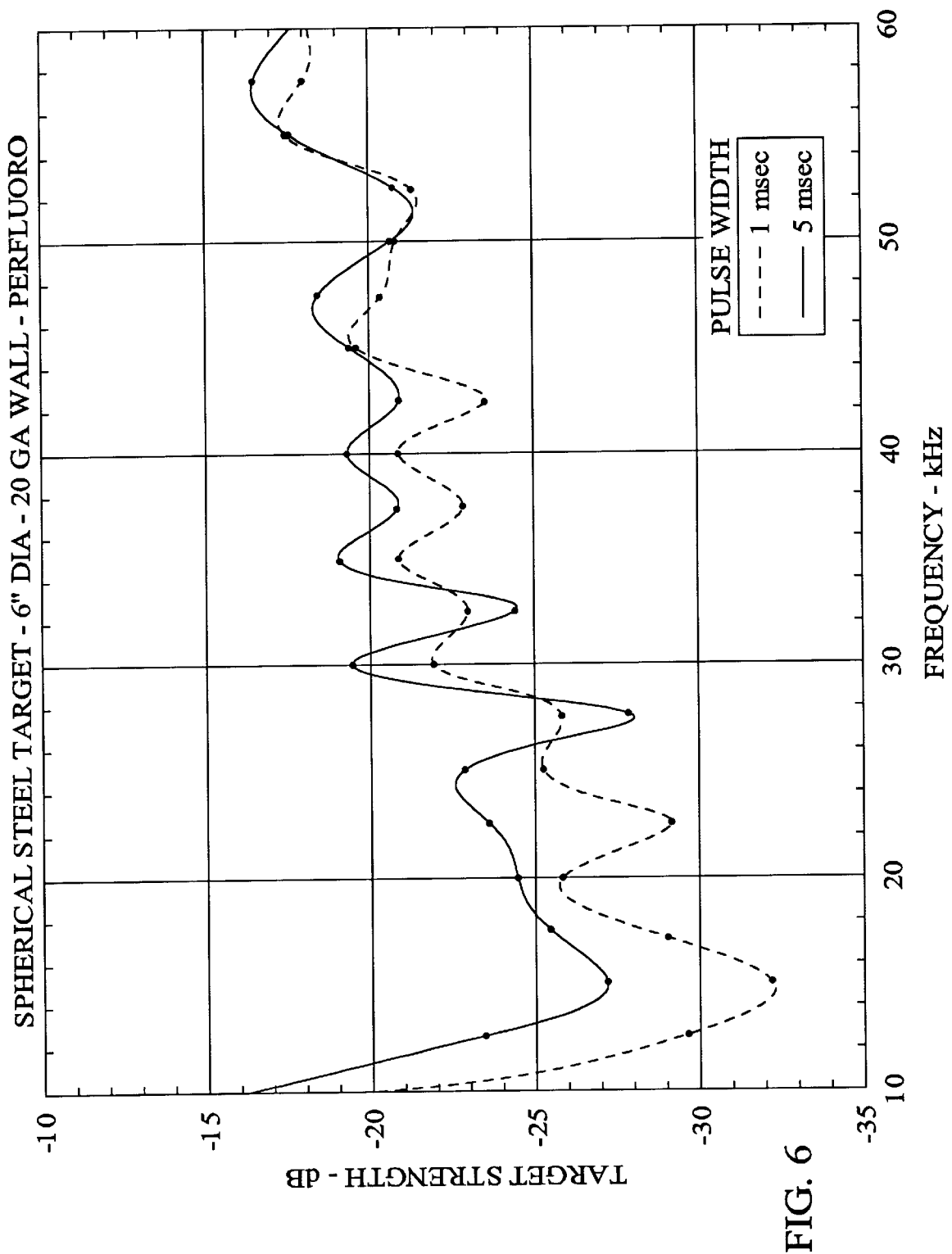
Figure 7:
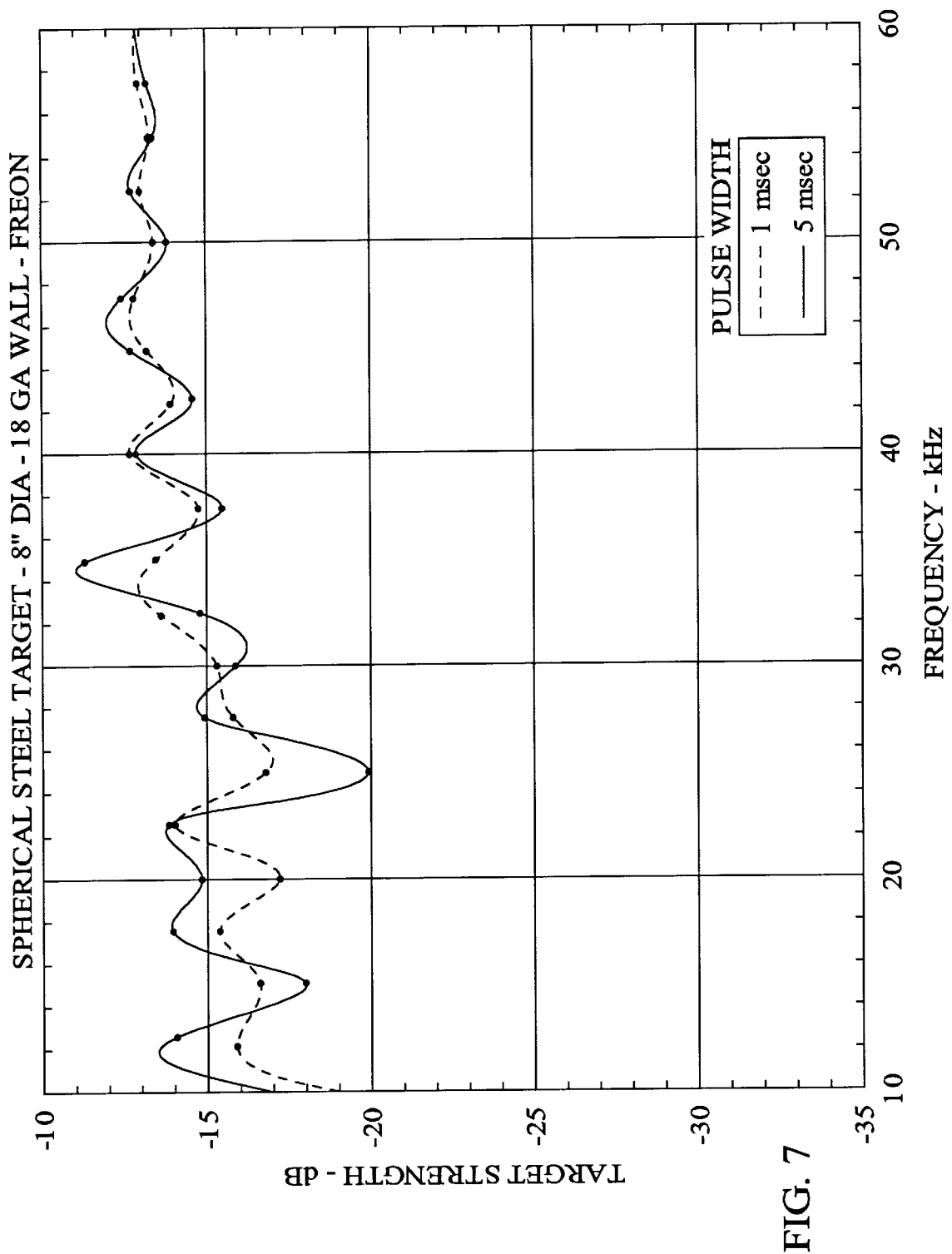
Figure 8:
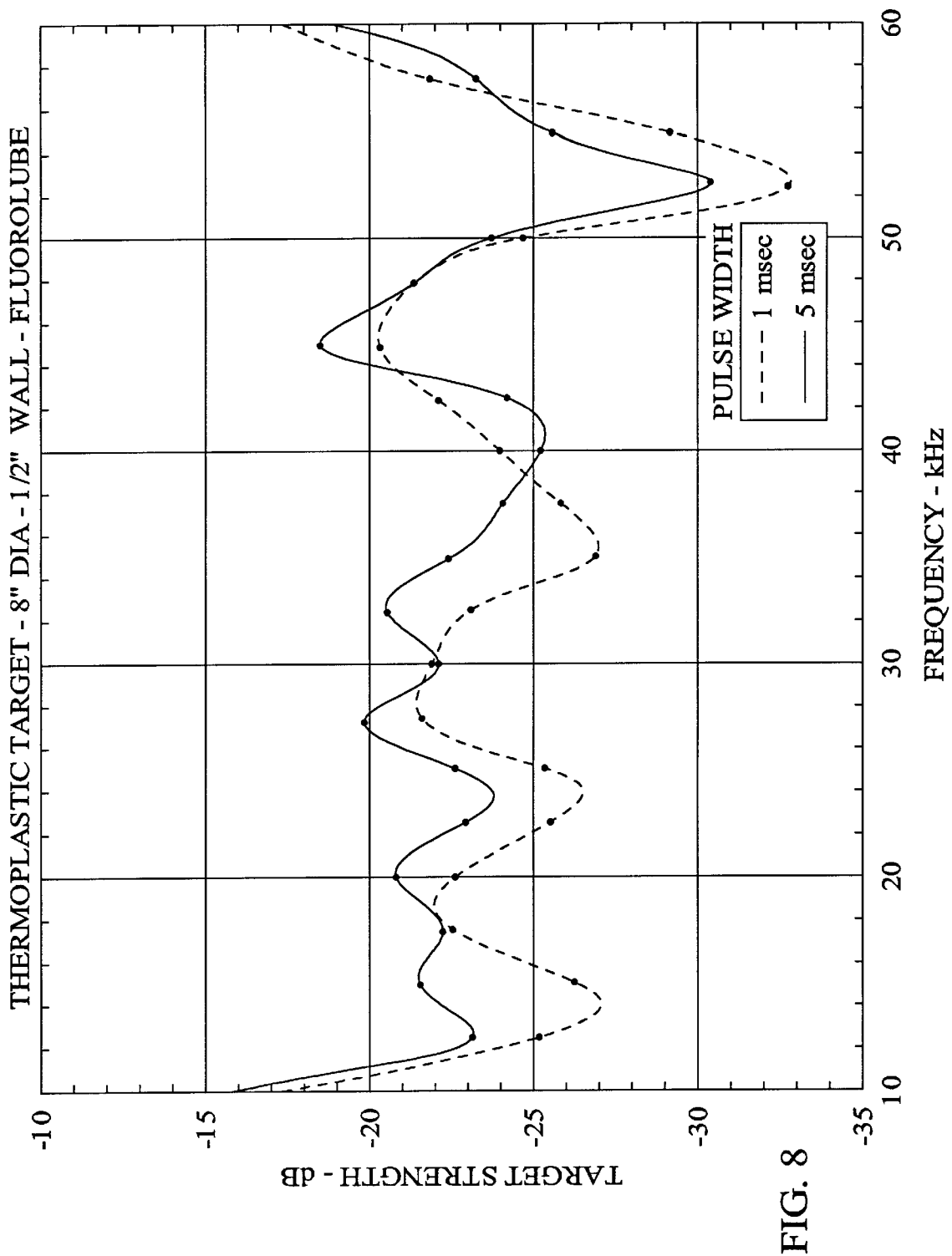
Figure 9:
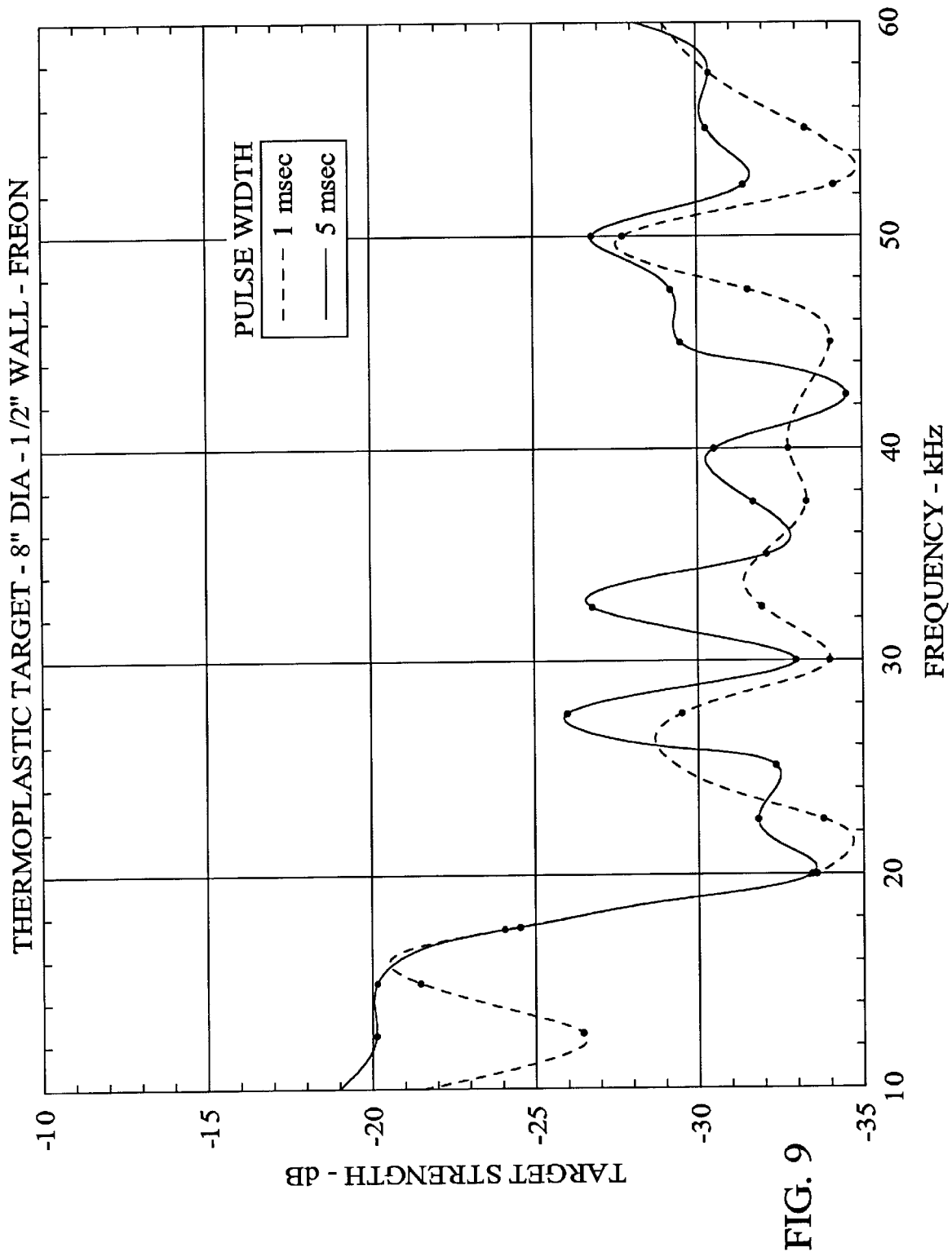

A computer program was developed to compute and plot the primary, nonreflected raypaths within the various transponders. This program permitted input of the various physical and acoustic characteristics of single, or multiple, sphere targets. The plots created through use of the program were used to determine the approximate focusing efficiency of the different target configurations. A sample program output is presented as FIG. 3. This particular diagram shows the poor focusing efficiency of a sphere containing a half inch thick outer thermoplastic layer with freon as the inner refractive fluid. The focal point is occurring before the back surface of the sphere. The predicted focusing efficiency is consistent with this transponder's relatively low target strength, as shown in FIG. 9.

In FIGS. 4–24, the target strengths of various combinations of spheres and fluids are shown. These target strengths were measured at the United States Navy's Transducer Evaluation Center (TRANSDEC) using pulsed measurement techniques. The TRANSDEC facility is an anechoic pool outfitted for precise, direct-pulse, sonar-type measurements. The TRANSDEC Sampling Digital Waveform Recorder System (SDWRS) was used to obtain target strength data. The test-setup and processing time needed to conduct each individual test required that some constraints be placed on the test methodology. Measurements were thus limited to every 2.5 Khz in the 10–60 Khz range, and every 5.0 Khz in the 50–250 Khz range. The test geometry and waveform sampling-time requirements limited the maximum usable pulsewidth to 5 msec. Appropriate sampling windows were selected for each pulsewidth and frequency range of interest. Calculations of the true rms energy content of the waveforms were made, the target strengths computed, and the results output in graphical form. Each data point presented on the accompanying graphs is the result of a calculation involving the average of four independent samples of each waveform at that frequency. Graph scaling was kept constant for all tests to make visual comparisons easier.

Emphasis was given to obtaining measurements in the 10–60 Khz frequency range using pulsewidths of 1 msec and 5 msec. Often, additional measurements were made in the 50–250 Khz range using various pulsewidths. This allowed for some comparison of the current test results with past measurement data from the previous single sphere acoustic lens work. A small, battery operated pump, with appropriate miniature nozzles, was used to expedite the refractive fluid filling process.

Regarding FIGS. 4–11, the annotation on a "single sphere" graph identifies the transponder's or target's sphere material, outer diameter, wall thickness and refractive fluid. The annotation on the "concentric-fluid" graphs, FIGS. 12–24, identifies the target's inner/outer shell diameters, and inner/outer fluids. The "fluid" wall-thickness of all concentric-fluid targets was selected to be 2.5 cm (1"). For these tests, the concentric fluid transponders were constructed of 20 gauge stainless steel shells.

The results of selected "single sphere" tests are shown in FIGS. 4 through 11. This data shows that the target strength of an individual target can vary widely with pulsewidth. The 1 msec and 5 msec curves may track each other in a general way, but considerable variations at a specific frequency can occur. Some variations (i.e., peaks and valleys) in the frequency response of these targets can be observed, but nothing substantial enough to be considered "tuned," or exhibiting frequency selectivity.

In contrast, the results of the "concentric-fluid" tests are presented in FIGS. 12 through 24. The frequency response behavior for some concentric-sphere combinations is similar to that observed for the single sphere cases. In other cases, the 1 msec and 5 msec curves are more consistent in tracking each other. This suggests that certain concentric-fluid target configurations are less sensitive to pulsewidth variations. This could allow longer pulsewidths (e.g., 10 msec) to be used effectively with this type of target.

It was observed that several concentric-fluid combinations exhibited dramatic variations in frequency response. The fluid combinations represented by FIGS. 12, 16, 18, 20, 21 and 22 show regions of frequency selectivity with slopes as great as 20 dB/octave.

Figure 10:
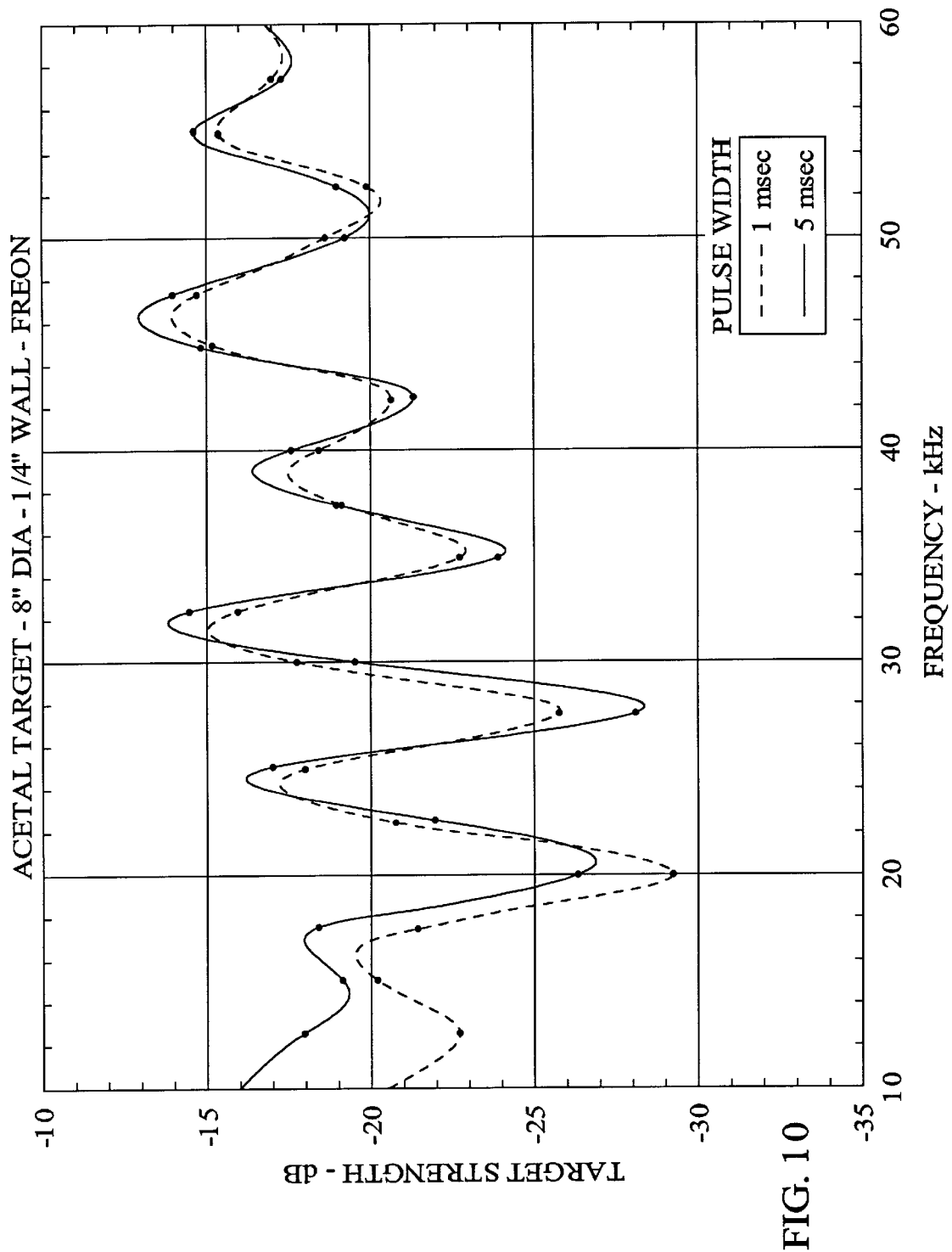
Figure 11:
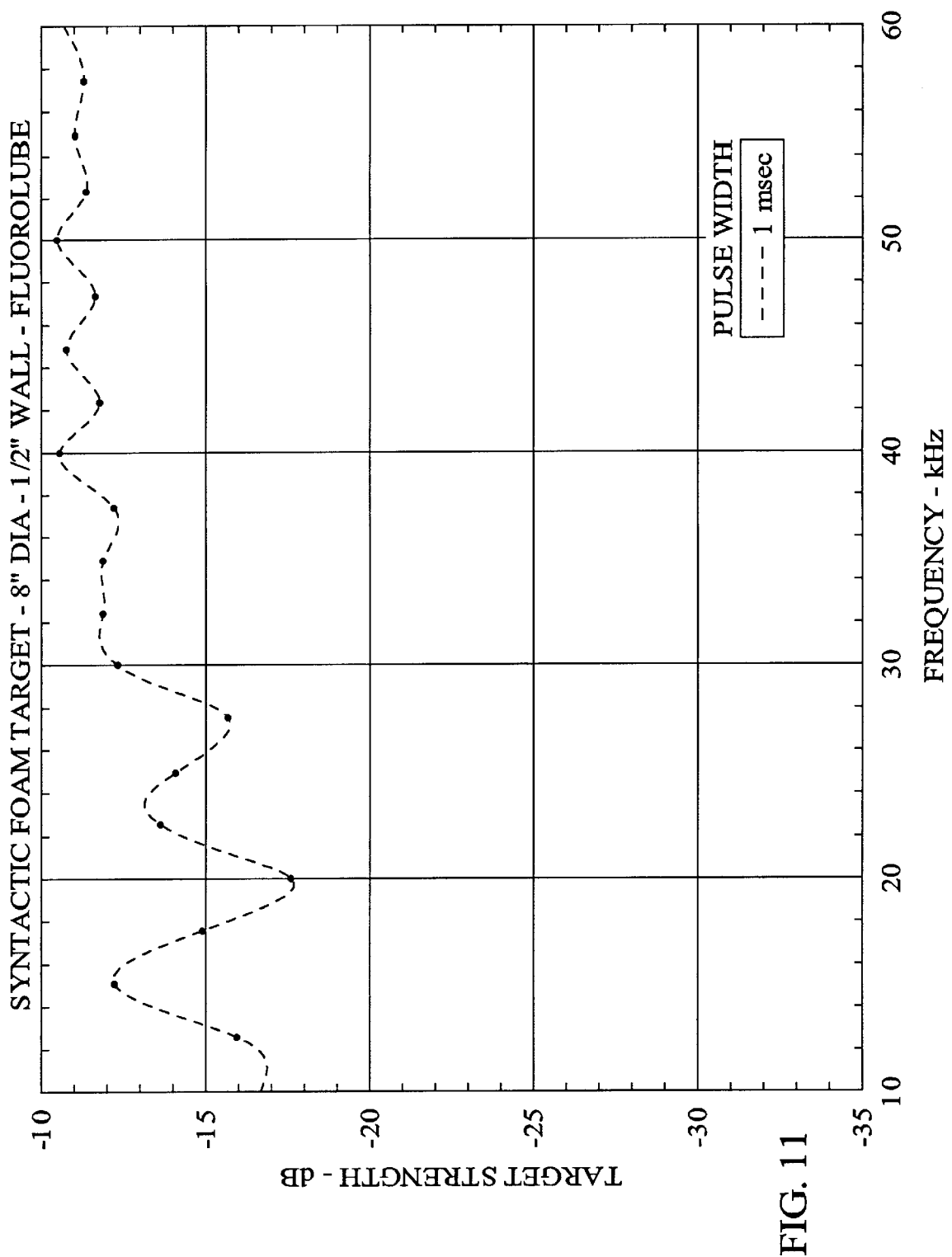
Figure 12:
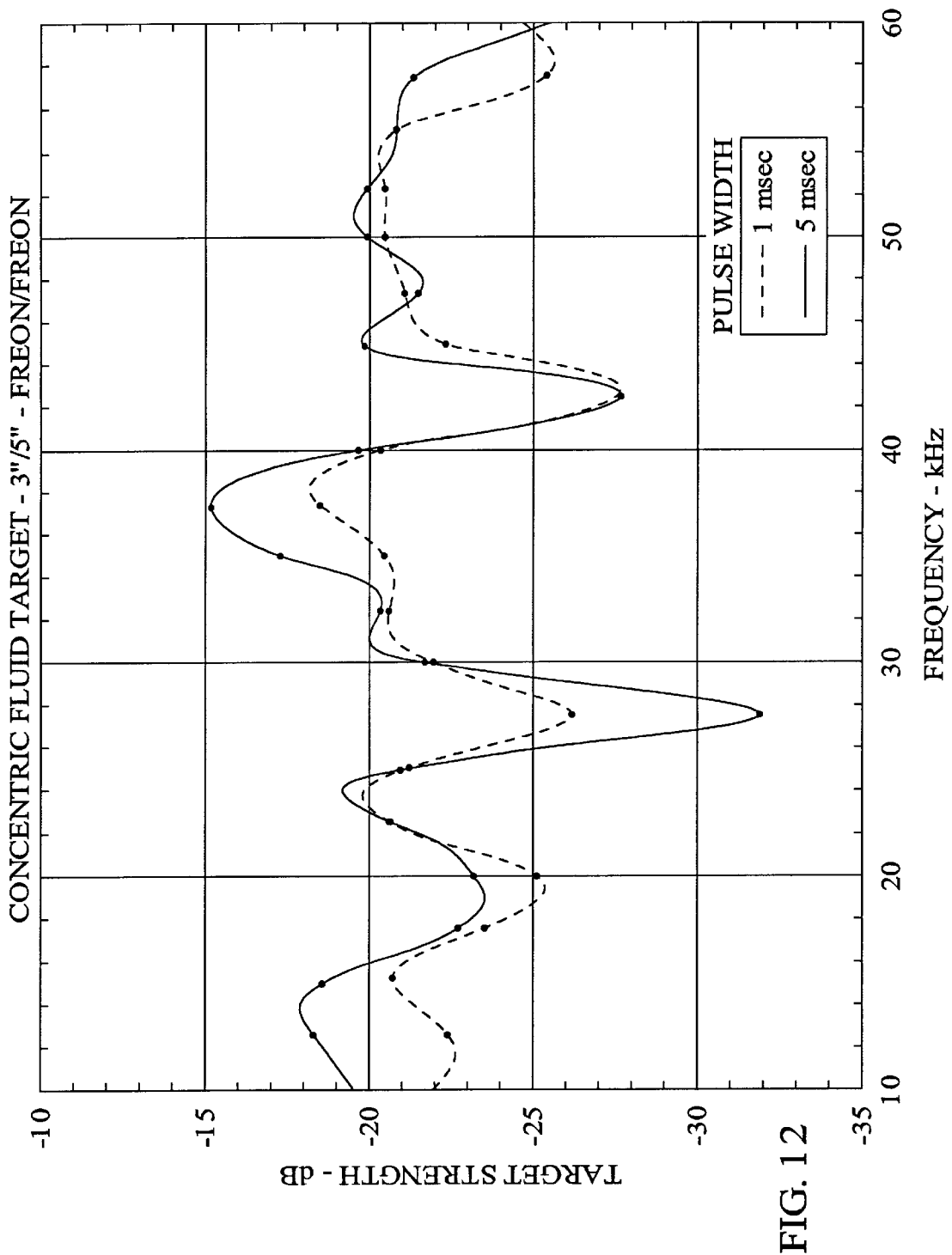
FIGS. 12–24 depict target strengths versus frequency for a number of concentric fluid acoustic transponders.
Figure 13:
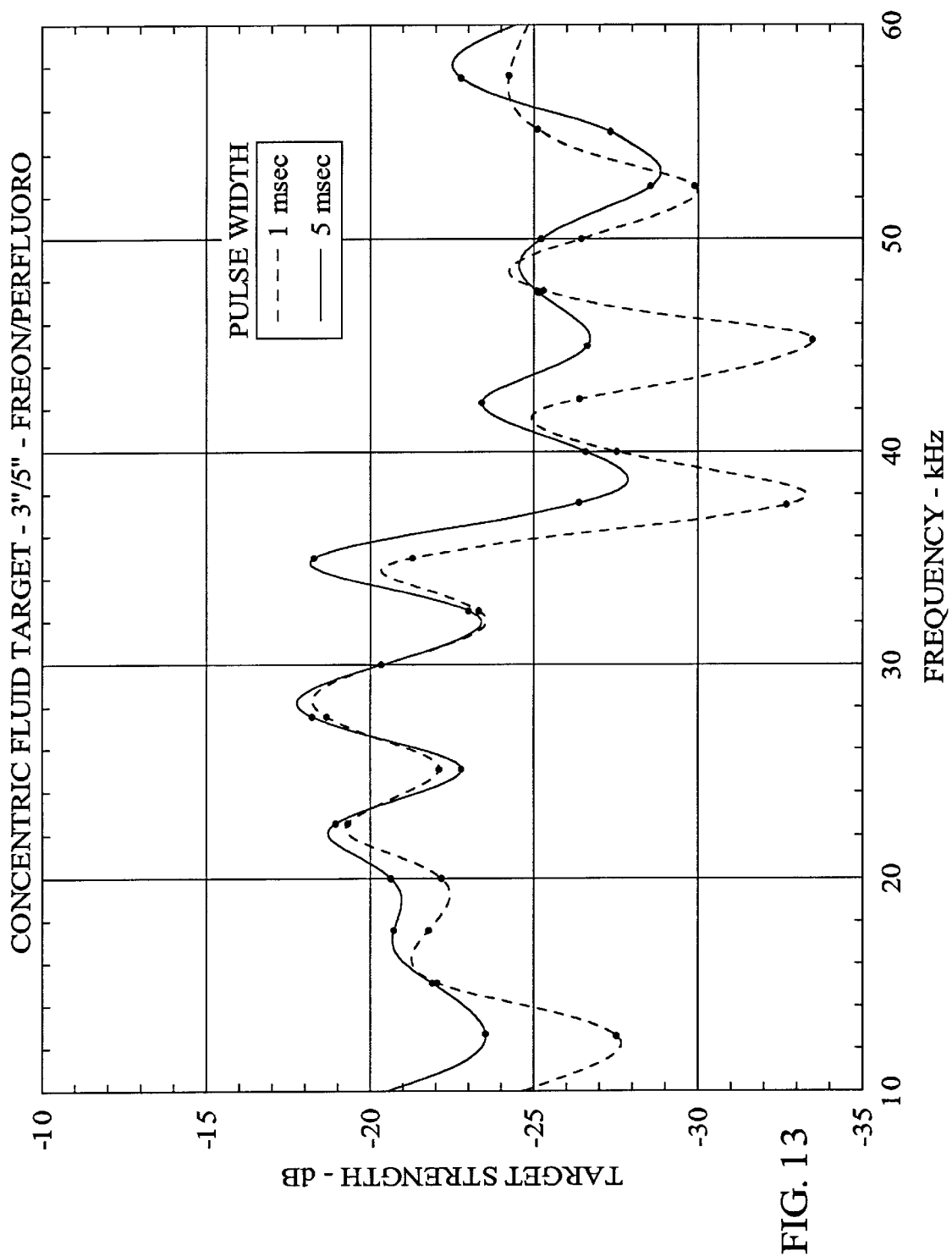
Figure 14:
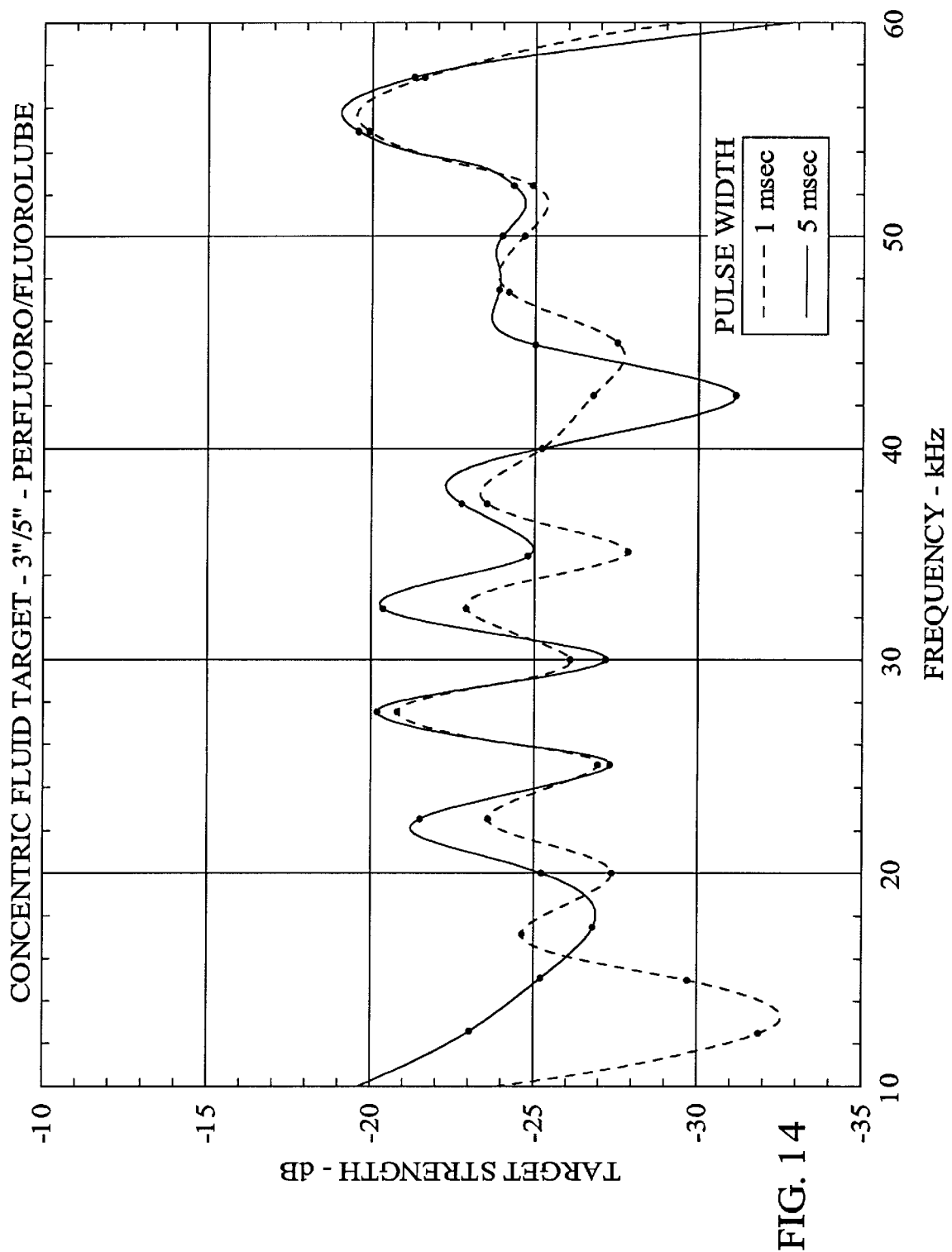
Figure 15:
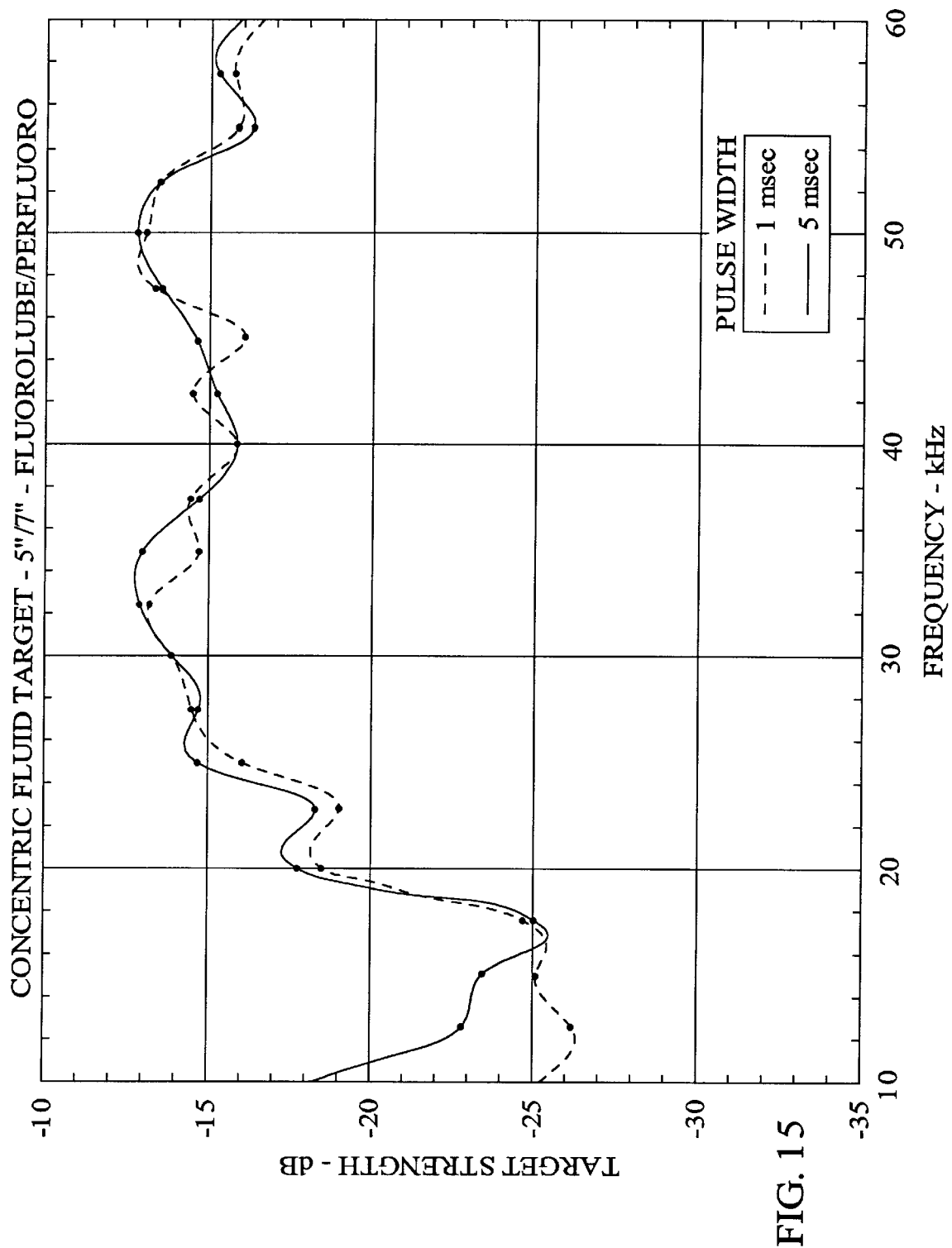
Figure 16:
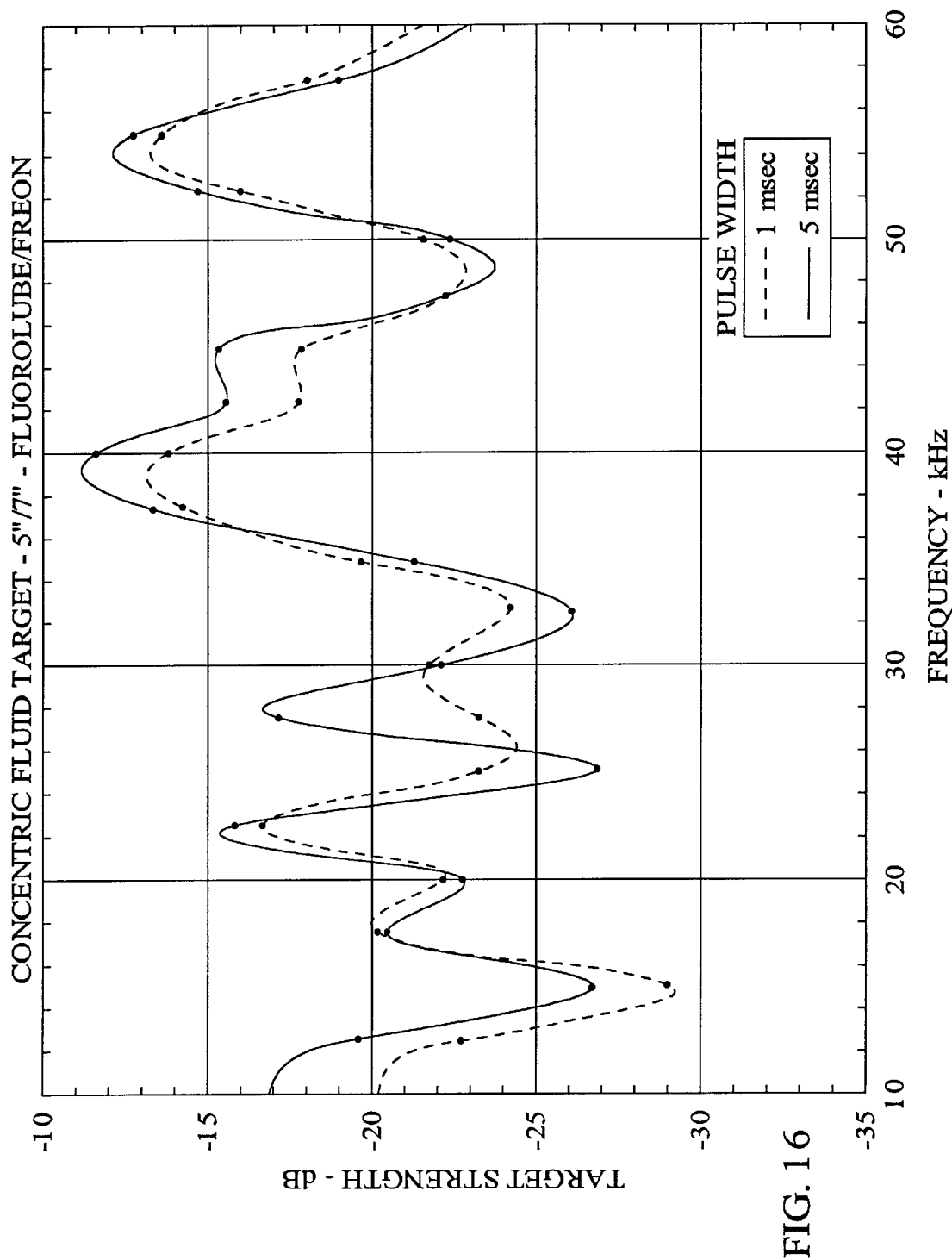
Figure 17:
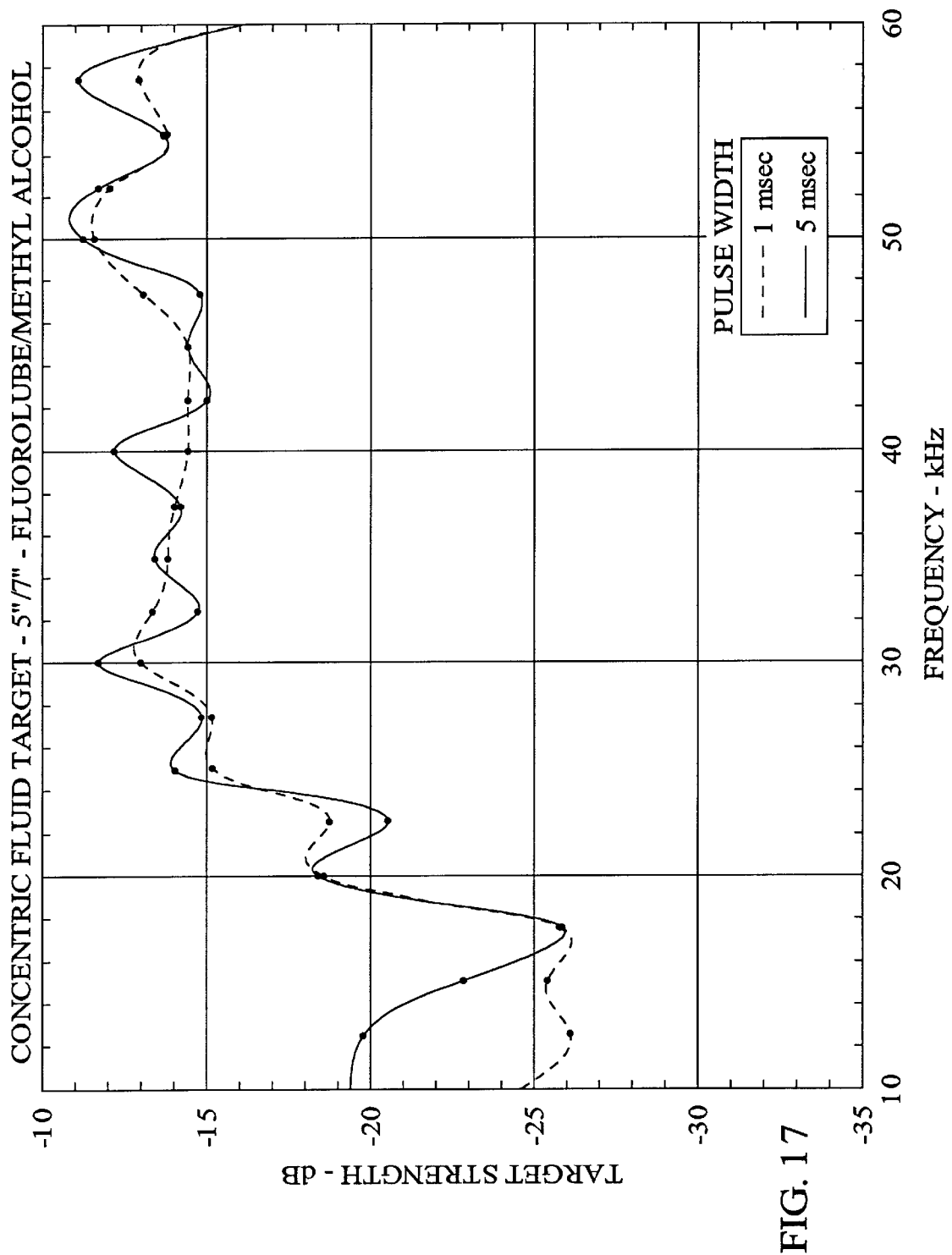
Figure 18:
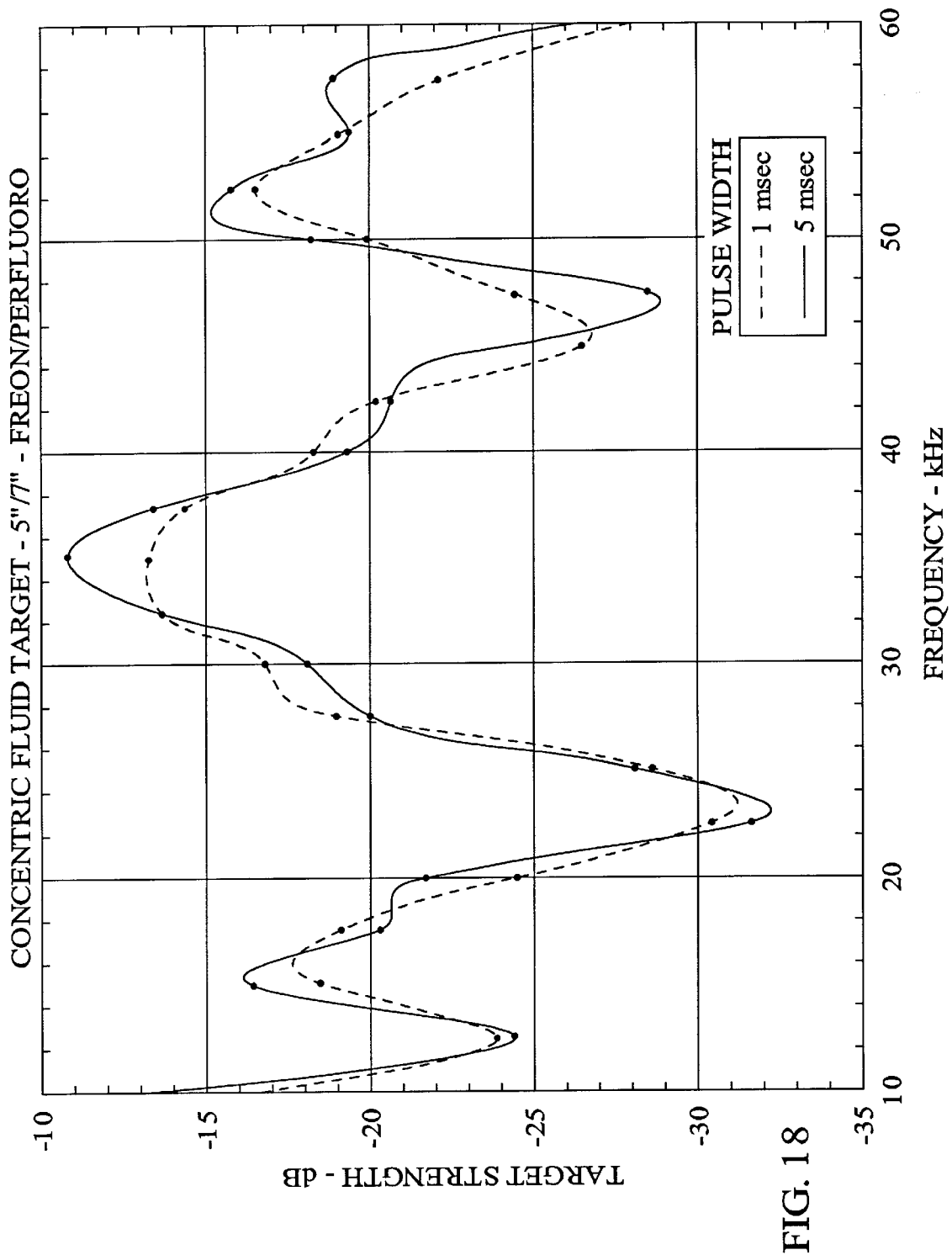
Figure 19:
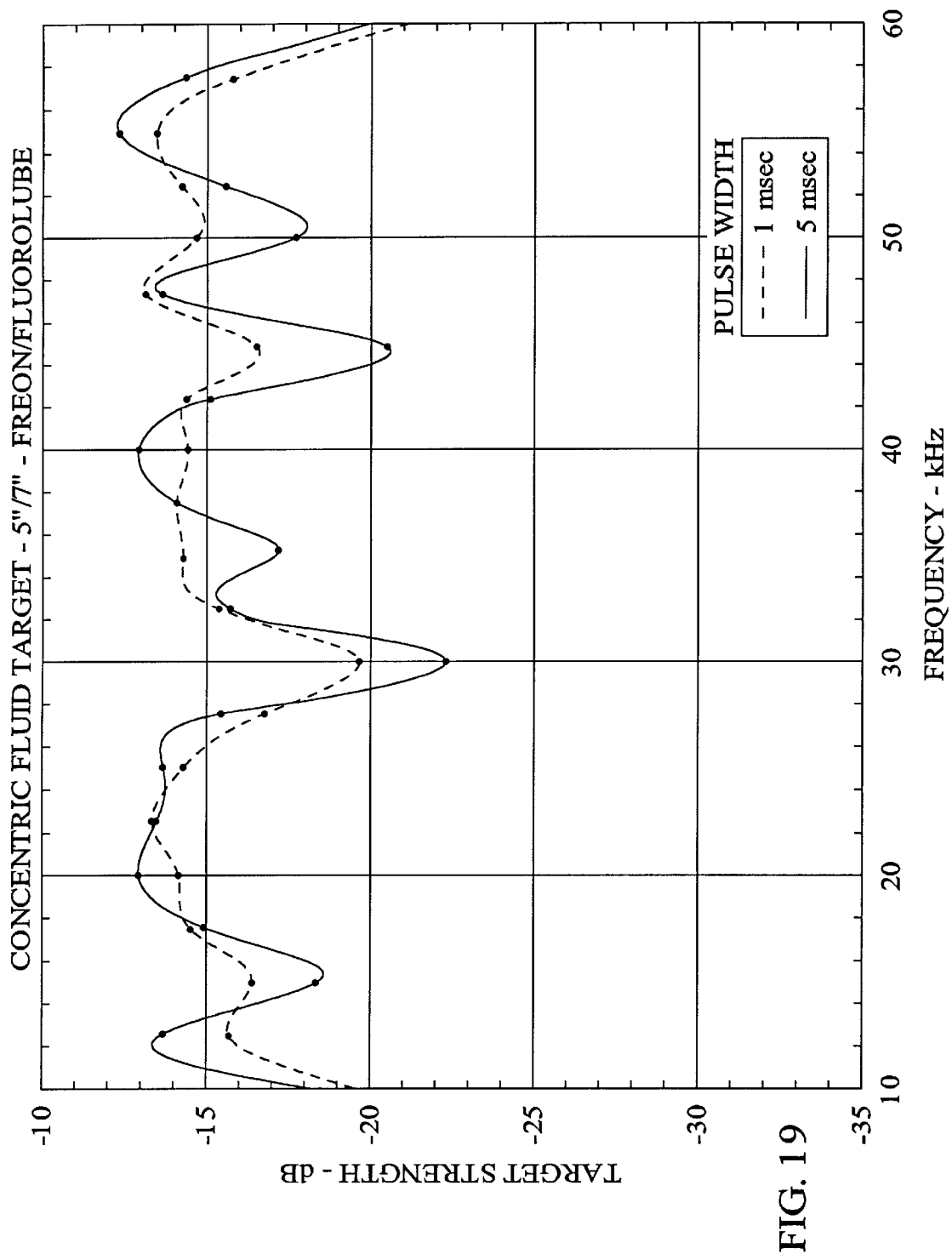
Figure 20:
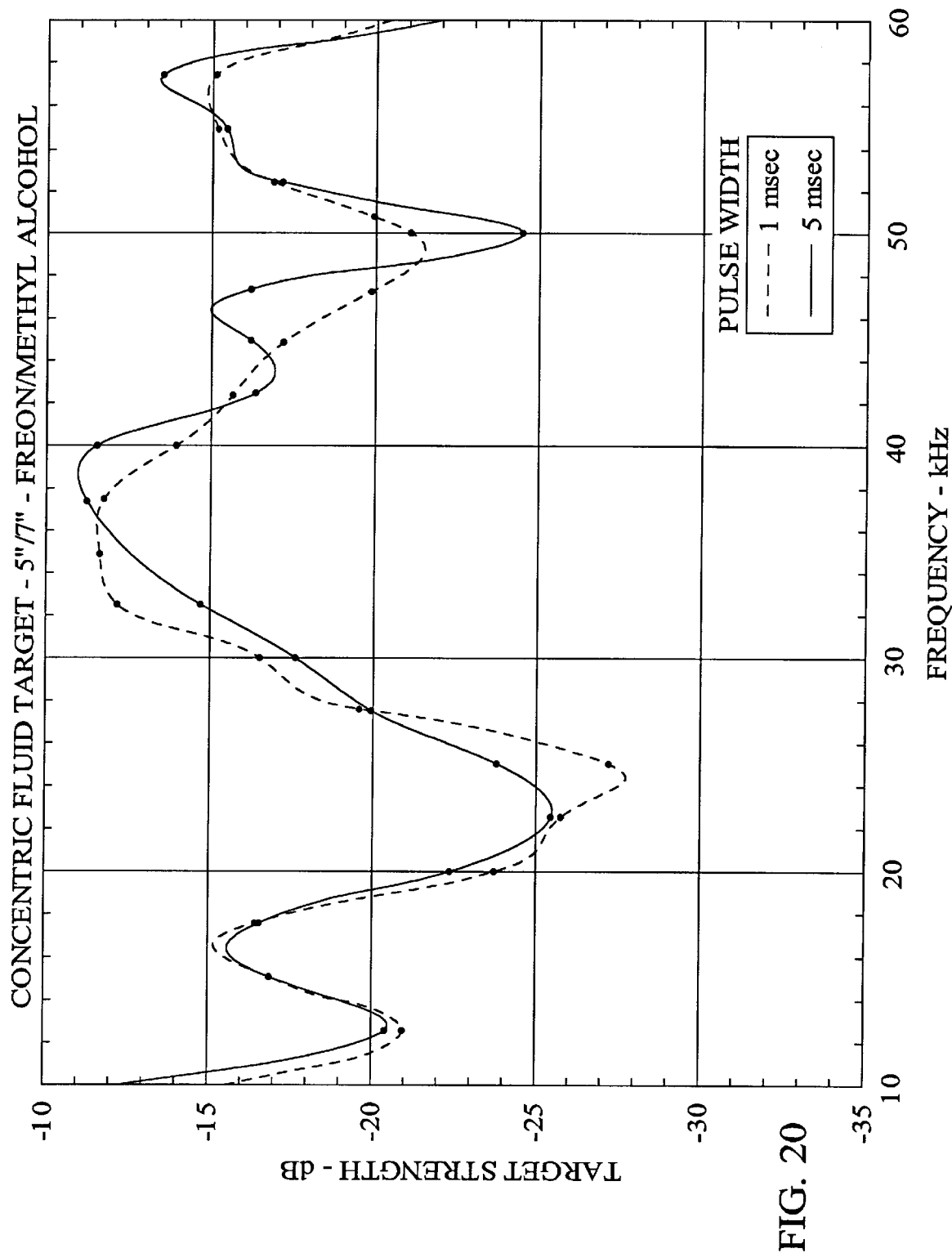
Figure 21:
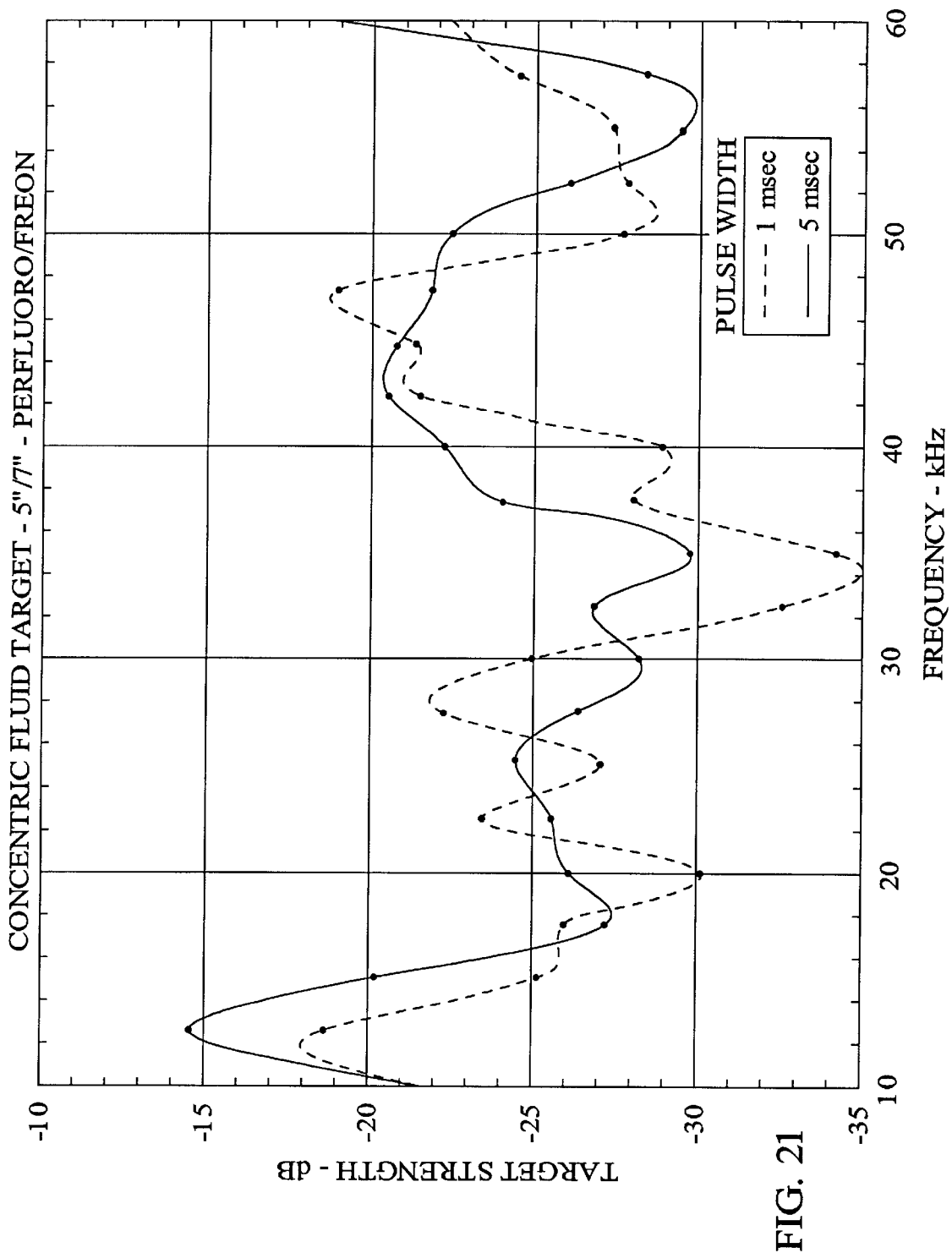
Figure 22:
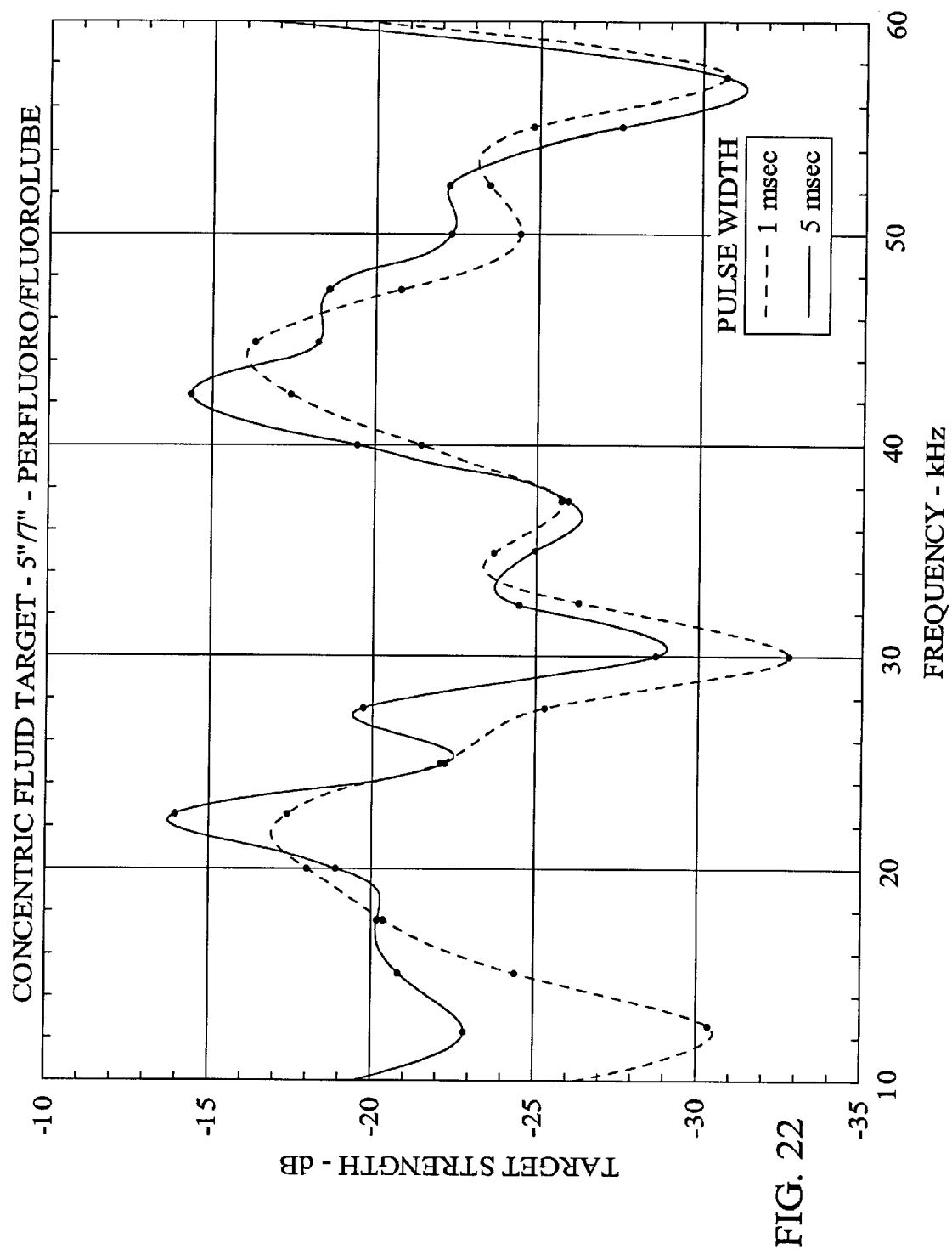
Figure 23:
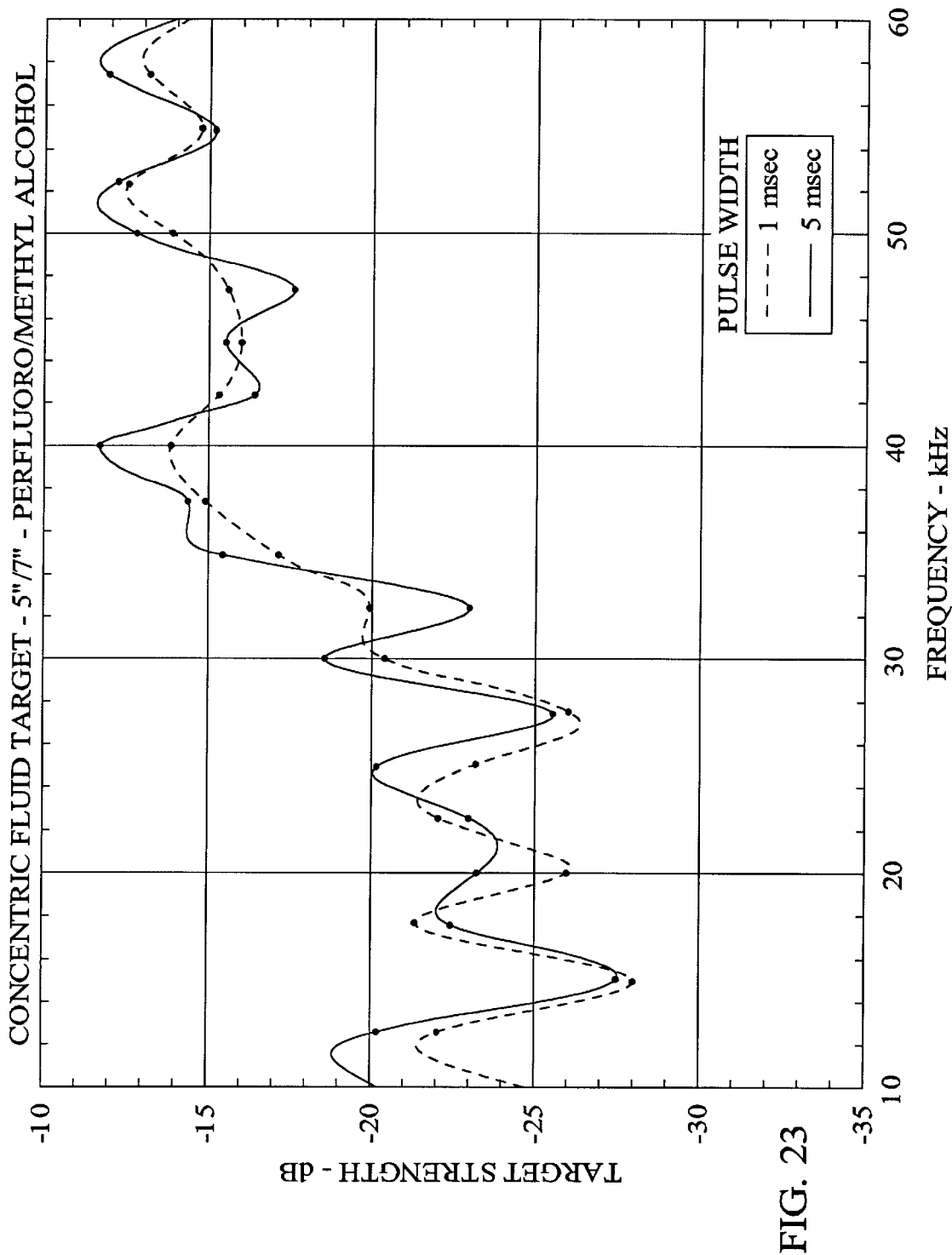
Figure 24:
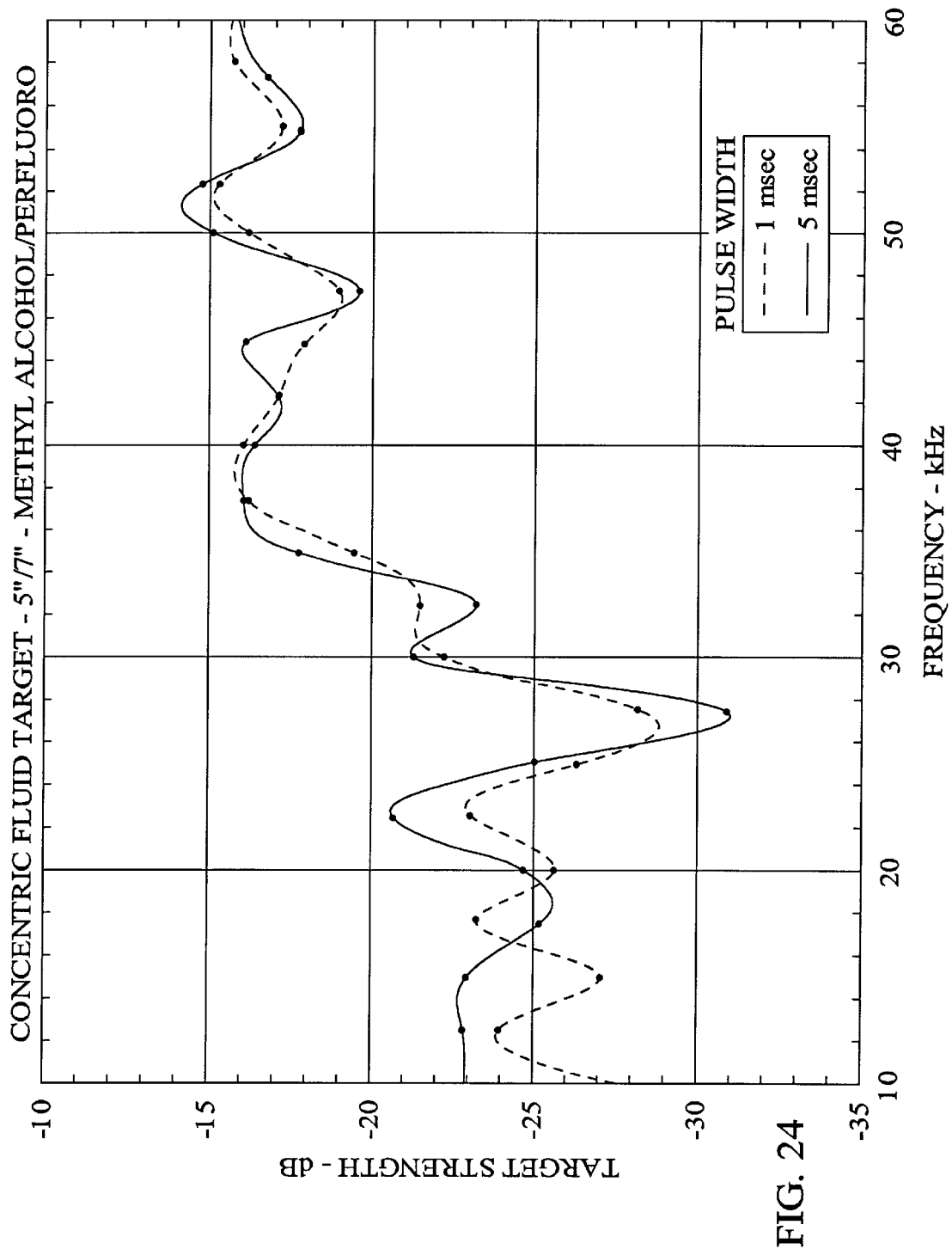

Several single and concentric sphere targets display a periodic, oscillatory response characteristic over a relatively broad frequency range, as evidenced in FIGS. 10, 13, and 14. The. periodic, oscillatory response characteristic offers the possibility of producing a passive target that could be "coded" to respond at a predefined series of frequencies. These targets, when insonified with the proper signal, would be uniquely identifiable. The insonifying signal could be discrete tonals, swept CW or white noise.

Further examination also reveals some targets displaying various degrees of lowpass, highpass, notch or bandpass frequency response. These can be seen in FIGS. 9, 15, 17, 20, 21, 23 and 24. These characteristics could be used, for example, in applications requiring uniquely identifiable targets.

These and other test results have shown that the outer fluid concentric region or layer behaves much like a "mechanical filter." This outer "filtering" layer can be configured to provide the target or transponder with varying degrees of frequency selectivity. The degree of selectivity (i.e., frequency bandwidth) will be determined by the various physical properties of the fluid, and by the outer fluid thickness relative to the wavelength of an impinging acoustic pulse. In this sense, it is possible to "groom" a particular transponder configuration to enhance frequency response characteristics. These include deep notches, and/or predefined periodic peaks, in the frequency response. Consequently, the outer fluid layer can be configured to provide a maximum acoustic response centered at a frequency, or wavelength, of interest.

The inner sphere of fluid of the acoustic transponder of the invention forms an acoustic lens that focuses any acoustic energy that it receives from the outer fluid layer. Any acoustic energy entering the inner fluid is refracted (i.e., raybending) by some amount. The degree of refraction will be determined by the refractive properties of the fluid. With the proper degree of refraction, this acoustic energy will be focused on, and reflected from, the back surface of the inner sphere. If this focusing effect is optimized correctly, the energy will be reflected back along a path in the direction from which it came. The reflected energy will exit the inner sphere along this path, and be transmitted back through the outer fluid layer. The efficiency of the inner sphere's focusing process, to a large extent, determines the overall strength of the reflected acoustic pulse (i.e., the "target strength").

For operational use, a target would be "tuned" to operate with a particular sonar system's transmit frequency and pulsewidth. After deployment at a worksite or other desired location, the target would be "illuminated" by the sonar's acoustic transmit pulse. The pulse would be accepted by the "tuned" target, focused, and reflected back toward the sonar platform. The reflected signal would be received and processed as usual. The relatively high target strength at the sonar's specific operating frequency would allow for reliable identification of the target. Other targets in the area "tuned" to a different, non-overlapping frequency range would not return any usable amount of energy. A sonar system transmitting broadband noise could also be used to acoustically illuminate a target, or targets. Each target would return substantially more energy in that portion of the noise bandwidth for which it has been "tuned" to accept. A swept-frequency, or frequency spectrum analysis, type sonar receiver would then be able to identify where a particular target was located by identifying its unique "frequency coded" acoustic reflection. A network of targets, each "tuned" to a different center frequency, could be simultaneously identified and located using this method.

The concentric-fluid transponder design of the invention allows for the construction of useful, thick-walled acoustic targets. This invention offers several potential advantages over the traditional, single-sphere, single-fluid, acoustic lens. Thick-walled targets can be fabricated by using various diameter, thin-walled shells to produce a desired outer-layer width, or thickness. Multiple combinations of refractive fluids offer more choices for adjusting frequency response as well as focusing, or target strength, performance.

The concentric-fluid transponder has proven to be rugged and convenient to use. This transponder is totally passive (i.e., requires no power source), has relatively high target strength, requires no maintenance, and has essentially an omnidirectional response characteristic in all planes. This allows for long-term use under adverse conditions. It can be used at almost any relative bearing between the navigating platform and the target. These transponders should not be difficult to package for deployment and use in the ocean.

It may be possible to increase the frequency selectivity, and/or the target strength, of this device by adding more fluid layers with different chemical and physical properties. This would require the development of a containment vessel with numerous containers that can be filled individually with fluid. Other target shapes besides spheres (e.g., cylinders) may also prove beneficial.

Obviously, many modifications and variations of the invention are possible in light of the above teachings. It is therefore to be understood that within the scope of the appended claims, the invention may be practiced otherwise than as has been specifically described.

What is claimed is:

1. An acoustic transponder comprising:
   a first hollow sphere fluid container for holding a first fluid; and
   a second hollow sphere fluid container surrounding said first container and attached thereto for holding a second fluid.

2. An acoustic transponder according to claim 1 in which said second fluid container is the innermost of a plurality of fluid containers surrounding said first fluid container.

3. A passive acoustic transponder system comprising:
   a transponder including
      a first hollow sphere defining a fluid core region;
      a second hollow sphere disposed to surround said first sphere, said second sphere defining a fluid layer region between said first and second spheres;
      a support structure disposed between said first and second spheres for concentrically positioning said first sphere with respect to said second sphere;
      a first liquid disposed within said fluid core region;
      a second liquid disposed within said fluid layer region, in which said first and second liquids differ in acoustic refractive properties;
   a mooring attached to said transponder for mooring said transponder to the bottom of a body of water; and
   a float attached to said transponder for suspending said transponder at a depth within said body of water that lies between said mooring and said float when said transponder system is deployed in said body of water.

4. A method for reflecting acoustic energy comprising:
   disposing a first acoustically refractive fluid within a first spherical container;
   disposing a second acoustically refractive fluid in a second spherical container disposed to surround said first container and to be concentric therewith;
   insonifying said containers of said first and second acoustically refractive fluids with said acoustic energy, in which said acoustic energy is refracted in said second fluid and is further refracted in said first fluid so that a reflection of said acoustic energy from said containers is a product of said first and second acoustically refractive fluids.

5. A passive acoustic transponder apparatus comprising:
   a first hollow sphere defining a fluid core region;
   a second hollow sphere disposed to surround said first hollow sphere; and
   a support structure attached between said first and second hollow spheres to concentrically position said first hollow sphere with respect to said second hollow sphere and to define a fluid concentric region between said first and second hollow spheres.

6. An apparatus according to claim 5 in which said fluid core region contains a first fluid and in which said fluid concentric region contains a second fluid different from said first fluid.

7. An apparatus according to claim 6 in which said first and second fluids differ in sound transmission characteristics.

8. An apparatus according to claim 7 in which the refractive characteristics of said first fluid are different from the refractive characteristics of said second fluid.

9. An apparatus according to claim 8 in which at least one of said fluids is a liquid.

10. An apparatus according to claim 5 in which said transponder is operably coupled to a mooring for mooring said transponder apparatus to the bottom of a body of water.

11. An apparatus according to claim 10 in which said transponder apparatus is operably coupled to a float for suspending said transponder at a depth within said body of water that lies between said mooring and said float when said transponder, mooring and float are deployed in said body of water.

* * * * *